US010302926B2

(12) United States Patent
Pretorius

(10) Patent No.: US 10,302,926 B2
(45) Date of Patent: May 28, 2019

(54) ARRANGEMENT FOR LIGHT SHEET MICROSCOPY

(71) Applicant: CARL ZEISS MICROSCOPY GMBH, Jena (DE)

(72) Inventor: Marco Pretorius, Oberkochen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 38 days.

(21) Appl. No.: 15/302,958

(22) PCT Filed: Mar. 27, 2015

(86) PCT No.: PCT/EP2015/056689
§ 371 (c)(1),
(2) Date: Oct. 7, 2016

(87) PCT Pub. No.: WO2015/155027
PCT Pub. Date: Oct. 15, 2015

(65) Prior Publication Data
US 2017/0038575 A1 Feb. 9, 2017

(30) Foreign Application Priority Data

Apr. 8, 2014 (DE) .................. 10 2014 104 977

(51) Int. Cl.
*G02B 5/00* (2006.01)
*G02B 13/18* (2006.01)
(Continued)

(52) U.S. Cl.
CPC ............. *G02B 21/08* (2013.01); *G02B 13/18* (2013.01); *G02B 21/02* (2013.01); *G02B 21/10* (2013.01);
(Continued)

(58) Field of Classification Search
CPC .. G02B 21/00; G02B 21/0004; G02B 21/002; G02B 21/0024; G02B 21/0032;
(Continued)

(56) References Cited

U.S. PATENT DOCUMENTS 5,969,854 A 10/1999 Stelzer et al.
2006/0033987 A1 2/2006 Stelzer et al.
(Continued)

FOREIGN PATENT DOCUMENTS

DE 102 57 423 A1 6/2001
DE 10 2011 000 835 A1 8/2012
(Continued)

OTHER PUBLICATIONS

PCT International Preliminary Report on Patentability for PCT/EP2015/056689, dated Oct. 20, 2016, 9 pages.
(Continued)

*Primary Examiner* — Derek S. Chapel
*Assistant Examiner* — Adam W Booher
(74) *Attorney, Agent, or Firm* — Patterson Thuente Pedersen, P.A.

(57) ABSTRACT

An arrangement for lightsheet microscopy. In the arrangement, a detection objective includes a first adaptive optical detection correction element arranged in the beam path or which can be introduced into the latter. Alternatively, or in addition, an illumination objective includes a first adaptive optical illumination correction element arranged in the beam path or which can be introduced into the latter. With the two correction elements, aberrations which occur because of the inclined passage through boundary surfaces of the separating layer system of light to be detected or of light for illuminating the sample can be reduced for a predetermined range of detection angles ($\delta$) or of illumination angles ($\beta$)
(Continued)

and/or for a predetermined range of the thickness of the at least one layer of the separating layer system.

12 Claims, 7 Drawing Sheets

(51) Int. Cl.
  *G02B 21/00* (2006.01)
  *G02B 21/02* (2006.01)
  *G02B 21/08* (2006.01)
  *G02B 21/10* (2006.01)
  *G02B 21/16* (2006.01)
  *G02B 21/36* (2006.01)
  *G02B 27/00* (2006.01)
(52) U.S. Cl.
  CPC ............ *G02B 21/16* (2013.01); *G02B 21/367* (2013.01); *G02B 27/0025* (2013.01); *G02B 27/0068* (2013.01); *G02B 5/005* (2013.01); *G02B 21/0076* (2013.01)
(58) Field of Classification Search
  CPC .............. G02B 21/0052; G02B 21/006; G02B 21/0072; G02B 21/0076; G02B 21/02; G02B 21/06; G02B 21/08; G02B 21/10; G02B 21/125; G02B 21/14; G02B 21/16; G02B 21/365; G02B 21/367; G02B 13/00; G02B 13/14; G02B 13/143; G02B 13/18; G02B 27/0025; G02B 27/0068; G02B 5/005
  See application file for complete search history.

(56) References Cited

U.S. PATENT DOCUMENTS

| | | | |
|---|---|---|---|
| 2006/0062929 A1 | 3/2006 | Kittle et al. | |
| 2007/0247725 A1* | 10/2007 | Dowski, Jr. ............ | G02B 13/12 359/676 |
| 2008/0030872 A1* | 2/2008 | Nishioka ............ | G02B 13/0045 359/683 |
| 2011/0115895 A1* | 5/2011 | Huisken ............. | G02B 21/0048 348/79 |
| 2012/0113524 A1 | 5/2012 | Kasahara et al. | |
| 2012/0206798 A1 | 8/2012 | Knop et al. | |
| 2013/0335818 A1 | 12/2013 | Knebel et al. | |
| 2015/0362713 A1* | 12/2015 | Betzig ................ | G02B 21/0064 250/459.1 |
| 2016/0131900 A1 | 5/2016 | Pretorius | |
| 2016/0154236 A1 | 6/2016 | Siebenmorgen et al. | |
| 2016/0349495 A1* | 12/2016 | Pretorius ............ | G02B 27/0025 |
| 2017/0293130 A1* | 10/2017 | Huang ............... | G02B 21/0088 |
| 2017/0307860 A1* | 10/2017 | Pretorius ................ | G02B 13/20 |

FOREIGN PATENT DOCUMENTS

| | | |
|---|---|---|
| DE | 10 2012 101 262 B3 | 4/2013 |
| DE | 10 2013 101 711 A1 | 8/2014 |
| DE | 10 2013 107 297 A1 | 1/2015 |
| DE | 10 2013 112 690 A1 | 5/2015 |
| JP | 2012-118509 A | 6/2012 |
| JP | 2014-202967 A | 10/2014 |
| JP | 2016-517971 A | 6/2016 |
| WO | WO 2004/052558 A1 | 6/2004 |
| WO | WO 2010/014244 A2 | 2/2010 |
| WO | WO 2012/110488 A | 8/2012 |
| WO | WO 2012/110488 A2 | 8/2012 |
| WO | WO 2012/122027 A2 | 9/2012 |
| WO | WO 2013/120800 A | 8/2013 |
| WO | WO 2013/120800 A1 | 8/2013 |

OTHER PUBLICATIONS

PCT International Search Report for PCT/EP2015/056689, dated Jun. 10, 2015, 4 pgs.
English translation of PCT International Search Report for PCT/EP2014/056689, dated Jun. 10, 2015, 3 pgs.
PCT Written Opinion for PCT/EP2014/056689, dated Jun. 10, 2015, 6 pgs.
J. Huisken et al., "*Selective Plane Illumination Microscopy Techniques in Development Biology*", Development Bd. 336, S. 63, 2009, 13 pages.
Japanese Office Action for Application No. 2016/560962, dated Dec. 4, 2018 and Translation (9 pgs).

* cited by examiner

ARRANGEMENT FOR LIGHT SHEET MICROSCOPY

RELATED APPLICATIONS

The present application is a National Phase entry of PCT Application No. PCT/EP2015/056689, filed Mar. 27, 2015, which claims priority from DE Patent Application No. 10 2014 104 977.2, filed Apr. 8, 2014, said applications being hereby incorporated by reference herein in their entirety.

FIELD OF THE INVENTION

The invention relates to an arrangement for lightsheet microscopy. Such an arrangement comprises an illumination optical system with an illumination objective for illuminating a sample located in a medium on a sample carrier via an illumination beam path. The illumination takes place with a lightsheet. The optical axis of the illumination objective and the lightsheet lie in one plane which, with the normal of a flat reference surface with respect to which the sample carrier—sometimes also designed as a sample vessel with side walls for receiving liquids—is aligned, encloses an illumination angle different from zero. In addition, the arrangement comprises a detection optical system with a detection objective in a detection beam path. Here too, the optical axis of the detection objective, with the normal of the reference surface, encloses a detection angle different from zero. Moreover, the arrangement also comprises a separating layer system with at least one layer made from a predetermined material with a predetermined thickness, which separates the medium from the illumination objective and the detection objective. The separating layer system is aligned parallel to the reference surface with a surface and, with this surface, is in contact with the medium at least in the area accessible to the illumination and the detection objective for illumination or detection.

STATE OF THE ART

In the simplest case, the separating layer system can be an air layer, which separates the objectives from the medium. The separating layer system is often the base of the sample vessel or of the sample carrier, if the objectives are arranged below it. Equally, it can also be a corresponding cover plate or cover glass with in each case an air layer which separates the base or the cover glass from the objective. If the objectives are designed as immersion objectives, the immersion medium is located between the cover glass and base of the sample vessel instead of air.

The illumination and detection objective are usually designed as two different objectives. However, they can also be designed as a so-called doublet, as is described for example in EP 0 866 993 B1. Both objectives are then integrated in a common assembly, the respective optical systems—i.e. the objectives with associated beam paths and optical elements arranged therein—then share some elements.

The invention thus relates in particular to a microscope objective for lightsheet microscopy which can be used in particular in such an arrangement as detection objective and/or as illumination objective. Such a microscope objective comprises a first lens group which images an object-side image field to infinity and a second lens group which is formed afocal and images a collimated beam path into an intermediate image plane. The first lens group images the wavefronts emerging from the sample and acted on by disturbing influences of the separating layer system after passage through the separating layer system—which can comprise for example the cover glass and an immersion medium—approximately to infinity, and thus generates an essentially collimated beam path. The microscope objective comprises in addition a second lens group which is formed afocal and images the collimated beam path in an intermediate image plane, in which, for example, a detector can be located. Alternatively, the intermediate image can also be captured and imaged by a third lens group, for example a tube lens system. The first and second lens group form the basic objective. In addition, an aperture diaphragm is arranged between the first and the second lens group, and is thus in an approximately collimated beam path or a pupil plane. It is imaged to infinity in the object space by the first lens group, with the result that on the object side an at least approximately telecentric beam path is formed.

Such an arrangement, as was previously described, is used in particular in the examination of biological samples, in which the illumination of the samples takes place with a lightsheet, the plane of which cuts the optical axis of the detection at an angle different from zero. The lightsheet usually encloses a right angle with the detection direction, which as a rule corresponds to the optical axis of the detection objective. With this technique, which is also called SPIM (Selective Plane Illumination Microscopy), spatial captures of thicker samples can also be taken in a relatively short time. On the basis of optical sections combined with a relative movement in a direction perpendicular to the section plane, a spatially extended image representation of the sample is possible.

The SPIM technique is preferably used in fluorescence microscopy and in this connection it is also called LSFM (Light Sheet Fluorescence Microscopy). The sample is evenly illuminated in the lateral direction, and a selective imaging, i.e. connected with low depth of field, is then possible in the direction perpendicular to the lightsheet. Compared with other established methods such as confocal laser scanning microscopy or two-photon microscopy, the LSFM technique has several advantages: since detection can take place in the widefield, larger sample areas can be detected. Although the resolution is somewhat lower than in the case of confocal laser scanning microscopy, thicker samples can be analyzed with the LSFM technique, since the depth of penetration is higher. Moreover, in this method, the light loading on the samples is lowest, which reduces, among other things, the danger of bleaching out the sample, since the sample is only illuminated with a thin lightsheet at an angle to the detection direction different from zero.

Both a static lightsheet, which is generated for example with the aid of cylindrical lenses, or a quasi-static lightsheet can be used. This can be generated in that the sample is scanned rapidly with a light beam. The lightsheet-like illumination forms in that the light beam is subjected to a very rapid movement relative to the observed sample and therefore occurs successively several times one after the other lined up several times successively. The integration time of the camera, on the sensor of which the sample is ultimately imaged, is chosen such that the scanning is completed within the integration time. Instead of a camera with a two-dimensional sensor field, it is also possible to use a line sensor in combination with a renewed scanning in the detection optical system. The detection can also take place confocally.

Recently, the SPIM technique has been described many times in the literature, such as for example in DE 102 57 423 A1 and in WO 2004/052558 A1 which builds on the latter or in the review article "Selective Plane Illumination Microscopy Techniques in Developmental Biology" by J. Huisken et al., which appeared in the journal Development vol. 336, p. 63 in 2009.

One of the main applications of lightsheet microscopy is in the imaging of medium-sized organisms with a size of several 100 µm to a few mm. As a rule, these organisms are embedded in an agarose gel, which is in turn located in a glass capillary. This glass capillary is introduced into a water-filled sample chamber and the sample is then pressed out of the capillary a little way. The sample in the agarose is then illuminated with a lightsheet and the fluorescence is imaged on a camera with a detection objective which is perpendicular to the lightsheet and thus also perpendicular to the optical axis of the illumination objective.

However, this procedure has some disadvantages. On the one hand, the samples to be examined are relatively large; they originate from developmental biology. The preparation thereof in special cylindrical tubes which are filled with agarose gel is complex and disturbs the normal laboratory routines. It is not compatible with standard sample preparations and standard sample holders. The unavoidable difference in refractive index between the cylindrical tube made of glass or plastic and the agarose gel also leads to optical aberrations which can impair the resolution power. In addition, because of the sample preparation and the dimensions of the sample chamber, the lightsheet is relatively thick and thus the achievable axial resolution is limited.

In order to be able to at least partially overcome these limitations, in recent years a SPIM setup has been realized in which the illumination objective and the detection objective are perpendicular to each other and are directed onto the sample at an angle in each case of 45° from above. If, for example, the plane of a table on which the sample vessel is stored, or another mostly horizontal plane, such as that of a cover glass or of the base of the sample vessel, is used as reference surface, the illumination angle and the detection angle are in each case 45°. Such a setup is described for example in WO 2012/110488 A1 and in WO 2012/122027 A1.

In such setups, the sample is located, for example, on the base of a sample carrier or sample vessel designed as a Petri dish. The Petri dish is filled with water or nutrient solution and the illumination objective and detection objective are immersed in the liquid. The water therefore also takes on the function of an immersion liquid. This approach offers the advantage of a higher resolution in the axial direction since a thinner lightsheet can be generated. Because of the higher resolution, smaller samples can also be examined and the sample preparation has also become simpler. However, it still does not correspond to the standard and nor are Petri dishes used for the examination of individual cells in fluorescence microscopy. This must be relatively large so that both objectives can be immersed in the dish without touching the edge of the dish. Microtiter plates—also called multiwell plates—which are standard in many areas of biology and are also used in the fluorescence-microscopic analysis of individual cells, cannot be used with this process since the objectives cannot dip into the very small depressions which are arranged in a grid on the plate. A further disadvantage is that, with this setup, an analysis of a large number of samples in a short time—a so-called High-Throughput-Screening—is not readily possible since the objectives need to be cleaned when the sample is changed in order to avoid contamination of the different samples. In arrangements as are known from the state of the art, a relative shift is further required between sample and objective in order to change the focal position. Through the corresponding movement, the sample constituents to be examined can float and, in the worst case, even leave the area of observation altogether.

One way of overcoming these disadvantages is on the one hand to maintain the configuration of an illumination angle and a detection angle of in each case 45° but to isolate the sample together with the surrounding medium from the surroundings. A possibility is to direct the two objectives not from above onto the sample but from below in the manner of an inverse microscope, where illumination and detection take place through the transparent base of the sample vessel. This transparent vessel base—for example a Petri dish or an object carrier—together with the liquid or air layer, which is located between base and objectives, then forms the separating layer system. Equally, the detection can furthermore also take place from above as long as the sample vessel is covered with a transparent lid, or is without such a lid—in this case the separating layer system only consists of an air layer in order to ensure the isolation. In this way, all typical sample vessels, for example also Microtiter plates, Petri dishes and object carriers can be utilized. In particular, contamination of the sample can also be avoided in the case of an analysis with a high throughput.

However, this advantage comes with the price of a further, serious disadvantage since, because of the use of the separating layer system—for example of the cover glass or the vessel base with accompanying air or immersion medium layer—even at low numerical apertures of for example NA=0.3, extreme imaging errors such as spherical aberration and coma arise because of the inclined passage of light to be detected or illumination light through the separating layer system with its boundary surfaces and thus correct imaging is no longer possible when using rotationally symmetrical standard objectives.

In order to overcome this problem, arrangements are known in the state of the art which are called transfer optics or relay optics. One such is described for example in DE 10 2011 000 835 A1. A symmetrical transfer optic images a complete sample volume, i.e. the entirety of all of the planes perpendicular to the axes lying in the sample volume, on the corresponding conjugated image planes and makes it possible, simultaneously, to position a cover glass or another medium or the separating layer system symmetrically in the beam path in the object space and in the image space in such a way that no imaging errors are caused.

A disadvantage with the use of such a transfer optic is that the latter must have an extremely high numerical aperture (NA) in order that it can simultaneously transfer the imaging beam path and the illumination beam path typically running at right angles thereto. For a high numerical aperture of the imaging beam path of the size NA=1.0, the required numerical aperture of the transfer optic quickly approaches the refractive index of the surrounding medium; the bundle of rays to be transferred thus form almost a cone of 180° in order to be able to transfer the aperture of the imaging objective and the aperture of the illumination objective simultaneously. This makes such relay optics technically very complex; the optics comprise a large number of optical elements. This makes them extraordinarily large, expensive and heavy; in addition, the total transmission of the system is greatly reduced due to the high number of optical boundary surfaces. Moreover, the optical surfaces are extraordinarily sensitive to tolerances during production and calibration of the components due to the large angles of incidence of the beams on the optically active surfaces which are unavoidable in the case of high numerical apertures.

A further approach for the elimination of the influences of a cover glass passed through at an angle is in the use of a correction optical system, called "virtual relay", which is formed rotationally symmetrical relative to the normal of the boundary surface and on one side is immersed in the immersion medium and on the other side is against air and which images the object in the air space with a lateral reproduction scale from the immersion medium which is exactly the same as the ratio of the refractive index of the immersion medium to air. Such an approach is described for example in DE 10 2013 112 690.6. A disadvantage of this concept is that the correction is only exact for a fixed thickness of the at least one layer of the separating layer system, i.e. of the object carrier or of the plate which forms the vessel base or the cover glass. The correction is incomplete for variable cover glass thicknesses. The additional component moreover requires a lot of space between the sample and cover glass and the actual objectives for detection and illumination. The latter must therefore be designed on a particularly large working distance, which tends to make the objectives large, technically complex and expensive and makes the correction much more difficult for a diffraction-limited image quality.

Correction means in the form of correction lenses or lens groups, which can be integrated into the illumination objective and/or into the detection objective, to overcome these disadvantages are proposed in DE 10 2013 107 297.6. As correction lenses, among other things, cylindrical lenses or non-axially arranged lenses are proposed there. The correction lenses can also comprise such elements with aspherical surfaces or with freeform surfaces. In addition, materials are used for the object carrier which have approximately the refractive index of the medium in which the sample is located—for example water or a nutrient solution, wherein adaptive optical elements for the manipulation of phase fronts of the illumination and/or of the detection light are proposed to overcome further errors. Specific details of how such correction means can be designed are, however, not given. The proposed correction lenses are additionally arranged in the objective only behind the front lens, which makes retrofitting of existing objectives more difficult.

Apart from the relay optic, none of the described systems is capable of compensating for errors which can arise because of different thicknesses of the cover glasses and/or in the case of different angles of incidence for the illumination or detection objective—the illumination angle and the detection angle are meant. However, when a relay optic is used, on the image-side an equivalent configuration with respect to the media and cover glasses used as well as the angle of incidence is also necessary. This makes practical use very complex since each cover glass and each angle of incidence would have to be determined as exactly as possible for an exact correction and then a corresponding cover glass would have to be used on the image-side. Compensating for fluctuations in the thickness of a cover glass, when, for example, another sample position is approached, is then almost impossible, however, since it cannot be assumed that any two cover glasses have the same thickness profile.

The object of the invention is therefore to provide as compact and cost-effective as possible a solution to correct such imaging errors which occur because of the steep passage of illumination light and detection light through the object carrier, the base of the sample vessel or a cover glass, through as simple as possible a correction element, which, moreover, is to be capable of taking into account during the correction different cover glass thicknesses and/or different angles of incidence. Advantageously, the further use of already available objectives is also to be made possible.

DESCRIPTION OF THE INVENTION

This object is achieved for an arrangement for lightsheet microscopy of the type described at the beginning in that the detection objective comprises a first adaptive optical detection correction element arranged in the beam path or which can be introduced into the latter and/or the illumination objective comprises a first adaptive optical illumination correction element arranged in the beam path or which can be introduced into the latter. Both with the first illumination correction element and with the first detection correction element, aberrations which arise because of the inclined passage through boundary surfaces of the separating layer system of light to be detected or of light for illuminating the sample can be reduced for a predetermined area of detection or of illumination angles. Alternatively or in addition, such aberrations, which arise during the inclined passage of the light, can be reduced for a predetermined area of the thickness of the at least one layer of the separating layer system. This can be realized in different ways.

A typical predetermined area for the thickness of a cover glass comprises for example ±30 µm about an average thickness of for example 170 µm. Within this range, the named aberrations can be reduced or excluded by the first detection correction element in the case of typical detection objectives with a numerical aperture of NA=1.0, or by the first illumination correction element. Other average thicknesses for cover glasses or sample carriers, as are commercially available, can also be predetermined; the thickness range can also be chosen to be larger or smaller depending on the configuration.

The predetermined ranges for detection and illumination angle lie for example in the range of ±5° around the respective average angle of incidence, which can lie, for the detection objective with for example a numerical aperture in the region of 1.0, at approximately 30° and, for the illumination objective with for example a numerical aperture in the region of for example 0.4, at approximately 60°, wherein the average angles of incidence can also be chosen to be different depending on the configuration of the arrangement, and the predetermined ranges can also be larger or smaller.

In a first embodiment, the detection objective comprises a first detection lens group, which images an object-side image field at least approximately into infinity, wherein slight deviations in respect of the imaging into infinity are permissible. It comprises in addition a second detection lens group. A detector can be arranged in the intermediate image plane but, depending on the imaging properties of the second detection lens group, the image can also be imaged by a further lens group, for example a tube lens group. Correspondingly, the illumination objective, where this is designed for the correction, comprises a first illumination lens group, which images an object-side image field at least approximately into infinity, and a second illumination lens group. Both in the case of the detection objective and also in the case of the illumination objective, the actual beam profile in the objective between the first and second lens group does not absolutely have to be collimated but an approximate collimation contributes to the avoidance of induced aberrations.

Both in the illumination objective and in the detection objective an aperture diaphragm is preferably arranged in each case behind the first lens group, which aperture diaphragm is in the—approximately—collimated beam path and is imaged to infinity in the object space by the first lens group, with the result that on the object side or illumination source side an approximately telecentric beam path exists. The adaptive optical first detection correction element is then arranged between the first and second detection lens group or can be introduced between the latter, the adaptive optical first illumination correction element is correspondingly arranged between the first and second illumination lens group or can be introduced between the latter, in each case preferably in the vicinity of an aperture diaphragm or a pupil plane of the respective microscope objective. If the correction elements are designed such that they can be introduced, the introduction can take place for example by pivoting or by screwing in; the correction elements are then additional modules for already existing objectives with corresponding receivers for such elements.

The second detection lens group can be designed such that it images the corrected wavefront directly onto a detector or into an intermediate image plane. In a preferred embodiment, the second detection lens group is formed approximately afocal in order to realize an interface to different tube optical systems. The same can be transferred to the second illumination lens group, and this can also be formed approximately afocal in a preferred embodiment. The afocality does not need to be completely achieved; imaging of the beam path in a slightly convergent or divergent beam profile is also permissible.

Both illumination objective and detection objective are particular embodiments of a microscope objective adapted to the respective purpose, as was described at the beginning, in which, between the first lens group and the second lens group, a first adaptive optical imaging correction element is arranged or can be introduced, with which aberrations which occur because of the inclined passage of light for detection or illumination of the sample through a sample carrier can be reduced for a predetermined range of angles of incidence with respect to the normal of the sample carrier and/or for a predetermined range of thicknesses of the sample carrier. That is, such aberrations can be corrected or reduced which can arise because of deviations from the thickness of a cover glass for which the microscope objective is designed, and/or because of angles of incidence which deviate from 0° relative to a normal of the cover glass or of the vessel base or of the sample carrier.

The first adaptive optical correction element and the first adaptive optical illumination correction element are preferably formed in each case as wavefront manipulators. Each of the wavefront manipulators preferably comprises two freeform surfaces which are movable with respect to each other laterally with respect to the optical axis, wherein by the term the optical axis is meant here the primary optical axis. In an alternative embodiment, the two freeform surfaces can be rotated in opposite directions about an axis of rotation which is perpendicular to the optical axis and which cuts the optical axis. This embodiment has the advantage that the wavefront manipulator does not then necessarily need to be arranged in the approximately collimated beam path but can also be arranged in divergent or convergent areas of the beam path. If several wavefront manipulators are used, both embodiments can also be combined. The principle of such a wavefront manipulator is described for example in DE 10 2012 101 262 B3, the disclosure of which is explicitly and completely included here, and to which reference is made in particular with respect to different embodiment possibilities for a wavefront manipulator. With a wavefront manipulator, imaging errors which correct other, external, imaging errors can be generated in a defined manner through manipulation of the wavefront.

The freeform surfaces of the wavefront manipulator can be represented as purely polynomial trends, i.e. no basic curvature needs to be taken into account. Explicitly, the formula $$z = \sum_{m,n=1}^{\infty} C_{m,n} x^m y^n \tag{1}$$

can be used for the determination of the two mostly identical freeform surfaces. For the further embodiments, it is assumed without loss of generality that the direction of shifting corresponds to the y-axis. However, wavefront manipulators are also conceivable in which the shifting takes place in the x-direction or in both directions.

In the simplest embodiment, the wavefront manipulator comprises precisely two freeform elements, which are shifted laterally, i.e. perpendicular to the optical system axis: one element by the distance s along the positive y-direction, the other simultaneously in the opposite direction by the distance s in the negative y-direction. The two freeform elements are therefore shifted in exactly opposite directions relative to each other and by the same amounts. In the simplest case, both freeform elements consist of a flat side and a freeform surface. The two freeform surfaces of the elements of the wavefront manipulator are, as a rule, identical, with the result that the two freeform elements complement each other in a zero position exactly to form a plane-parallel plate. Deviations therefrom are possible in order to take into account non-paraxial effects.

The profile function of the freeform elements can be described by a function which is given by an antiderivative—the first integral—of the desired wavefront change in the direction parallel to the direction of shifting of the elements and, in the direction perpendicular thereto, by a function proportional to the desired wavefront change effect.

A purely defocusing effect can be achieved for example if the freeform surface is described by a polynomial of the third order, $$z(x, y) = k \cdot \left( x^2 \cdot y + \frac{y^3}{3} \right) \tag{2}$$

wherein it is assumed that the lateral shifting of the elements takes place along the y-axis. The parameter k scales the profile depth and, in this way, determines the achievable refractive power change per unit of the lateral shifting path s.

A wavefront manipulator for the generation of primary spherical aberration can be described, for example, by the profile function $$z(x, y) = k \cdot \left( y \cdot x^4 + \frac{2}{3} \cdot (x^2 \cdot y^3) + \frac{y^5}{5} \right). \tag{3a}$$

The freeform elements can also be designed to influence other wavefront errors of higher order. Several wavefront manipulators of different types can also be coupled one behind another in order thus to eliminate different errors successively.

The most important aberrations which are to be corrected in the case of inclined passage of a light beam through a cover glass or a layer of the separating layer system are coma and astigmatism. A wavefront manipulator for the generation of primary coma can be described, for example, by the profile function $$z(x, y) = k_1 \cdot \left(\frac{1}{2}(x^2 \cdot y^2) + \frac{y^4}{4}\right) + k_2 \cdot x + k_3 \cdot y \quad (3b)$$

if a lateral shifting takes place along the y-direction, or by the profile function $$z(x, y) = k_1 \cdot \left(\frac{x^3 \cdot y}{3} + x \cdot y^3\right) + k_2 \cdot x + k_3 \cdot y, \quad (3c)$$

if a lateral shifting takes place along the x-direction.

A wavefront manipulator for the generation of primary astigmatism in the y-section can be provided, for example, with a profile which has the profile function $$z(x, y) = k_1 \cdot \left(\frac{y^3}{3} + x \cdot y^3\right) + k_2 \cdot y. \quad (3d)$$

For further details, reference is made to the already named DE 10 2012 101 262 B3.

Between the freeform surfaces of the wavefront manipulator of the microscope objective which can move relative to each other—that is the detection and/or the illumination objective—an immersion medium is introduced in each case in a preferred embodiment. In this way it is possible to set a predetermined wavelength dependence of the wavefront change using the manipulator. In particular, an achromatic effect can be set, for example.

Through the immersion medium, a variable liquid lens is formed between the movable freeform surfaces of the wavefront manipulator. The wavefront manipulator then realizes the function of an achromatic—actually dichromatic—vario lens, which fulfils the so-called achromatism condition $$\frac{n_1 - 1}{v_1} - \frac{n_2 - 1}{v_2} = 0.$$

$n_1$ is the refractive index of the two freeform elements of the wavefront manipulator and $n_2$ is the refractive index of the immersion medium, and $v_1$ and $v_2$ are the corresponding, associated Abbe numbers, in each case at an average length of the observed spectral range. The effect of the wavefront manipulator is then identical at least for these two wavelengths but also very close for all further wavelengths coming into consideration. With such an achromatic wavefront manipulator, wavefront manipulations can be carried out essentially without colour errors. The achromatic effect can be achieved in this way for all errors which can be set with the wavefront manipulator—in particular also for the asymmetrical errors coma and astigmatism according to the above-named equations (3b)-(3d).

In practice, it needs to be taken into account that the choice of optical materials is limited, i.e. as a rule the above-named achromatism condition is only approximately achieved. Therefore, for the materials involved, the expression $$\left|\frac{n_1 - 1}{v_1} - \frac{n_2 - 1}{v_2}\right|$$

is preferably smaller than 0.05, wherein in a particularly preferred embodiment the expression is smaller than 0.01; sufficient achromatization is achieved here in any case. Ideally, the expression should be smaller than 0.001.

Alternatively or in addition, a clear separation can be achieved between a change in the average focal position on the one hand and a change in the longitudinal colour error on the other hand, when the optically active materials of the freeform elements of the wavefront manipulators on the one hand and the immersion medium on the other hand have almost the same refractive index but significantly different Abbe numbers. In a preferred embodiment of the invention, these materials therefore fulfil the conditions $|n_1-n_2|\leq 0.05$ and $|v_1-v_2|\geq 5$ simultaneously, particularly preferably the conditions $|n_1-n_2|\leq 0.01$ and $|v_1-v_2|\geq 10$ simultaneously and ideally the conditions $|n_1-n_2|\leq 0.002$ and $|v_1-v_2|\geq 15$ simultaneously. The greater the difference in the Abbe number, the smaller the lateral shifting paths can be and the flatter the profiles of the freeform elements can be formed, which makes their manufacture easier. Suitable material combinations are easy to find, since the dispersion of organic hydrocarbons at refractive powers typical for glass is higher without exception than that of glass. For the case that the freeform elements are formed from plastic, an aqueous solution doped with alkali ions comes into consideration as immersion medium, for example.

For further details relating to the adaptation of an immersion medium between the freeform elements, reference is made once more to DE 10 2012 101 262 B3, the disclosure content of which is included here completely.

If an immersion medium is introduced between the freeform surfaces of the wavefront manipulator which can move relative to each other, the freeform elements moved with respect to each other are sealed in a liquid-tight manner, for example with the aid of a sealing member made from an elastic plastic film, a bellows construction or similar.

The optical elements on which the freeform surfaces of the wavefront manipulator are formed are preferably manufactured from a material with an abnormal partial dispersion and in addition or alternatively the immersion medium, where present, has a dispersion profile which deviates from the normal line. The freeform elements can therefore be formed from media the refractive index dispersion of which deviates from the normal line. Such materials include, for example, long-crown or short-flint glasses. Secondary chromatic aberrations can thereby be set or corrected in a targeted manner. Such secondary colour errors can also normally only be corrected by several lenses when at least one of these lenses is formed from such a glass with an abnormal partial dispersion. However, such glasses have numerous disadvantages and undesired properties. In particular, they are comparatively expensive and difficult to process since they are chemically very sensitive to alkaline- or acid-containing grinding and polishing agents. In contrast here the freeform elements can be formed from cost-effective, acid-resistant normal glasses while an organic hydrocarbon which has a deviation in the dispersion behaviour from the normal line and is therefore suitable for correcting secondary colour errors can be used as immersion medium between the freeform elements. With the aid of the wavefront manipulator, a correction of the secondary spectrum can thus be achieved in alternative ways with only normal glasses, that is those glasses which lie on the normal line in the Abbe diagram.

As already mentioned, the second lens group of the microscope objective—this applies to the detection objective and the illumination objective equally—which is arranged on the side of the wavefront manipulator facing the observer or the illumination source, is formed, in a preferred embodiment, approximately afocal, such that different basic objectives and different microscope tube systems can be freely combined with each other. This is a so-called "infinite interface". In this case, in particular for the detection objective, a third lens group is arranged behind the second detection lens group, thus on the side facing away from the object, if the second lens group is formed approximately afocal. In the case of the detection objective this is formed as a tube lens group; together, all three lens groups of the detection objective generate a real intermediate image which can either be observed visually enlarged or be captured by a corresponding detection device such as a digital camera. The same can also be realized for the illumination objective, where required. The second lens group of the microscope objective can, however, also be designed such that it images the corrected wavefront directly, without a tube lens group, onto a detector or an intermediate image plane.

The first adaptive optical detection correction element or the first adaptive optical illumination correction element, which are both designed as wavefront manipulators, can be arranged fixed in the beam path of their respective objective. Alternatively, they can also be introduced into the beam path, for example in the manner of a connectable or insertable module. In this case the wavefront manipulators compensate for all disturbing optical influences of a layer of variable thickness in the separating layer system—for example of a cover glass of variable thickness—and/or variable angles of incidence for the objective between the objective axis and the surface normal of the reference surface, which coincides, for example, with the surface normal of the cover glass. In this case, the setting ranges of the wavefront manipulators are asymmetrical. The basic microscope objective—either the illumination objective or the detection objective—without the manipulator can be designed completely rotationally symmetrical, with the result that it can also be used for normal microscopic applications in which there is no break in the rotation symmetry as is caused by the inclined angle of incidence, without further modifications. The total correction of all influences of the obliquely passed through cover glass or separating layer system is ensured by the wavefront manipulator operated with asymmetrical angles of incidence. The wavefront manipulator, both for the illumination objective and also for the detection objective, can thus be incorporated in the basic objective or pivoted in in the area of the collimated beam path for SPIM applications as an additional module at a point in the area between the first and second lens group provided for this, i.e. either between the first detection lens group and the second detection lens group or between the first illumination lens group and the second illumination lens group. For usual microscopic purposes, the wavefront manipulator can be removed or pivoted out. This is advantageous insofar as the wide variety of required objectives can be limited in this way.

The correction function can also be divided over two or more optical elements. In this case the detection objective preferably comprises in addition to the first adaptive optical detection correction element a correction lens for correcting aberrations at a predetermined detection angle and a predetermined thickness of the layer of the separating layer system. The detection correction lens is preferably formed with at least one freeform surface. It can form the front lens but it can also be designed as a lens which can be pivoted into the beam path at another point—for example in the area of the wavefront manipulators. Correspondingly, the illumination objective comprises in addition or as an alternative an illumination correction lens for correcting aberrations at a predetermined illumination angle and a predetermined thickness of the layer of the separating layer system. This is preferably also formed as a freeform lens but it can also be designed as a lens which can be pivoted into the beam path. In this case, the first adaptive optical detection correction element and the first adaptive optical illumination correction element are designed limited to only correct aberrations which arise because of deviations from the predetermined thickness and/or from a predetermined angle of incidence. The disturbing optical influences in the case of fixed nominal values of the layer thickness of the at least one layer of the separating layer system, for example the cover glass, and of the angle of incidence of the primary objective axis with respect to the normal of the reference surface are compensated for by a static correction lens. This can also be a lens which is rotationally symmetrical with respect to the normals of the reference surfaces but it can also be a freeform lens. The optical influences which form from the fluctuations in the layer thickness and the angles of incidence about these nominal values are compensated for by the first adaptive optical detection and illumination correction element. When using a wavefront manipulator, as was already described above, this is then designed such that the adjustment paths of this wavefront manipulator are essentially symmetrical about a zero position when the cover glass parameters also change symmetrically about their nominal values.

The freeform surfaces of the detection correction lens and of the illumination correction lens are described by an equation of the form $$z = \frac{(x^2 + y^2)/R}{1 + \sqrt{1 - (1+k) \cdot \frac{(x^2 + y^2)}{R^2}}} + \sum_{m,n=1}^{\infty} C_{m,n} x^m y^n. \qquad (4)$$

Here, k is the so-called conic constant, R refers to the radius of an imaginary cone section at the apex of this surface, i.e. the distance of the apex from the nearest focus. Both the apex and the foci of the cone section lie on the optical axis.

By the coordinates x and y, a point on the lens surface is described in a coordinate system with the optical axis along the z-direction. $x^2+y^2$ thus refers to the square of the distance of the point from the optical axis. The function $z(x, y)$ refers to the distance of the lens surface from a vertical plane on the optical axis at the apex of the cone section at the coordinate pair (x, y). $c_{m,n}$ refers to the coefficients of a polynomial in x and y. The coefficients $c_{m,n}$, the conic constant k and the radius R are determined iteratively. The z-axis refers to the primary optical axis of the objective.

It was thus shown that the best position for the correction of the imaging errors caused by the inclined passage through the separating layer system lies in the front part of the detection objective or in front of the detection objective. In particular, one or two such freeform surfaces can also impinge on the first lens of the detection object, placed on the object side. The obliquely passed through separating layer system generates, as main image errors, first of all rotationally symmetrical image errors such as defocusing and spherical aberration. However, these can mostly be corrected simply using customary rotationally symmetrical lenses in the objective or through the air gaps thereof. In addition, axial coma and axial astigmatism also occur as well as image errors of higher orders, which, however, cannot be corrected by the described measures. However, these can be practically completely corrected by a single freeform lens if both the front and the rear side of the lens are formed from suitably chosen freeform surfaces. The z-axis is the primary optical axis of the objective, i.e. the optical axis of the rotationally symmetrical lenses of the objective without the freeform elements since, strictly speaking, the objective with the asymmetrical freeform surfaces no longer has an optical axis.

The first detection lens group and the at least one layer of the separating layer system preferably form an optical system which approximately fulfils the condition $$h_1 = f_{FG} \cdot \sin \sigma_0 = n_0 f_{FG}' \cdot \sin \sigma_0' \qquad (5);$$

deviations of up to 10% from this condition are permissible and can be tolerated. $h_1$ is the height of incidence of the opening beam on the wavefront manipulator, $\sigma_0$ is the angle of beam inclination of the marginal beam against the optical axis, $f_{FG} = -n_0 * f_{FG}'$ is the front, object-side focal length of the front lens group and $n_0$ is the refractive index of the immersion medium between object and front lens. This condition can be fulfilled, for example, by a front lens group which consists—except for the freeform lens for correcting the inclined beam passage through the separating layer system—only of spherical lenses. However, the condition can be fulfilled particularly simply and exactly if the first detection lens group comprises a rotationally aspherical lens near to the above-mentioned aperture diaphragm. The use of at least one rotationally symmetrical aspherical lens is advantageous in particular in the case of objectives with the greatest aperture or large aperture angle and it then supports not only the correction of the usual opening errors, i.e. the spherical aberration, but also the maintenance of the sine condition of the front lens group named in equation (4). Although this sine condition is usually fulfilled for an entire microscope objective, since otherwise no sharp imaging in an extended image field would be possible, individual subgroups of an objective do not necessarily need to fulfil this condition.

In a particularly preferred embodiment, the detection objective comprises at least one further adaptive optical detection correction element which can be introduced into the beam path or is arranged therein; alternatively or in addition, the illumination objective also comprises at least one further adaptive optical illumination correction element which can be introduced into the beam path or is arranged therein. These further adaptive optical imaging correction elements are likewise preferably again designed as wavefront manipulators. With these further adaptive optical correction elements, further errors can be corrected, for example aberrations can be corrected which form through changes in the optical properties of an immersion medium or of the separating layer system. Such corrections are required, for example, when another immersion medium with another refractive index or another cover glass is used. The adaptation to different angles of incidence of the illumination and of the detection objective can also take place with the aid of a further adaptive optical correction element. Those aberrations which arise on focusing on other object focal lengths can also be corrected. The wavefront manipulator can also introduce a cubic phase term which, in conjunction with a deconvolution algorithm to be applied to the point response in the receiver plane, permits an increase in the depth of field. The further adaptive optical detection correction elements and illumination correction elements can also be designed for the internal focusing accompanied by the simultaneous correction of spherical aberrations occurring during focus changing or to increase the depth of field. Several correction functions can thus be realized in a modular manner by connecting one after the other several wavefront manipulators designed for the respective correction functions. For example, it is possible to integrate into the microscope objective, in the detection objective, first of all a first wavefront manipulator to correct varying thicknesses of the cover glass, a second to correct the spherical aberrations arising during focusing on different object focal lengths and a third to correct the errors arising on changing the immersion medium. Each of the adaptive optical imaging correction elements is introduced between the first and second lens group of the respective objective, i.e. in particular of the illumination and/or of the detection objective. Since the objective is designed such that there is a parallel beam path in this area between the first and the second lens group, in which the manipulators are used, wavefront manipulators can be added to or removed from the same objective at will without the microscope objective losing its approximately diffraction-limited imaging properties, or to maintain the latter even with changed conditions.

The directions of movement of the different wavefront manipulators can also be different. If, for example, two wavefront manipulators are used in the same objective, the lateral movability of one of the wavefront manipulators can lie, for example, in the x-direction and the lateral movability of the other wavefront manipulator can lie, for example, in the y-direction, wherein the lateral directions of the movement do not necessarily need to be perpendicular to each other. Alternatively, wavefront manipulators can also be used in which the shifting corresponds to a rotation in which the two freeform surfaces of a wavefront manipulator are rotated in opposite directions to each other about an axis of rotation which is perpendicular to the primary optical axis. The axis of rotation cuts the primary optical axis. Finally, those wavefront manipulators which operate with a rotation can also be combined with those which operate with a purely lateral shifting.

In the case of microscope objectives for lightsheet microscopy, the invention can be realized similarly in particular in the case of detection objective and illumination objective, with the result that the position of the lightsheet can coincide synchronously with the sample plane focused on in each case. In the illumination objective, the task is considerably simplified, however, in that the numerical aperture here typically only lies in the range of NA=0.5 and in that the demands on the wavefront quality in the illumination optical system are typically lower compared with the imaging optical system.

It is understood that the features named above and those yet to be explained below can be used not only in the stated combinations but also in other combinations or alone without departing from the scope of the present invention.

BRIEF DESCRIPTION OF THE DRAWINGS

The invention is explained in yet more detail below by way of example with reference to the attached drawings, which also disclose features essential to the invention. There are shown in.

DETAILED DESCRIPTION OF THE DRAWINGS

Although the examples explained below relate explicitly to a detection objective, they can also transfer readily to an illumination objective or to another microscope objective.

Figure 1:
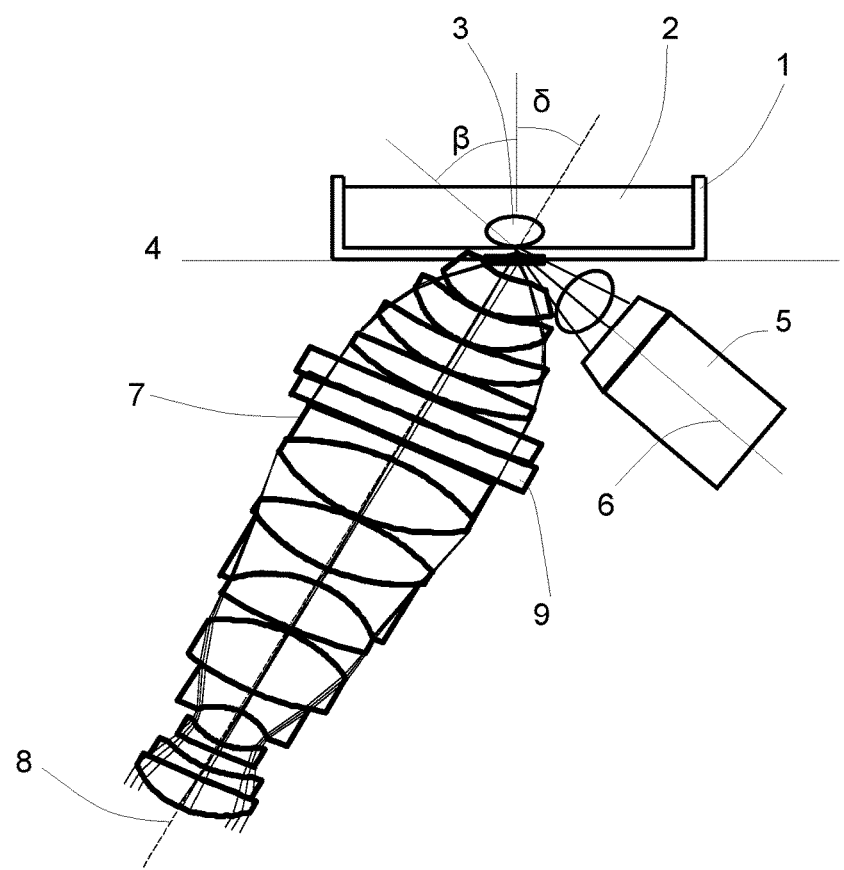
FIG. 1 the basic setup of an arrangement for lightsheet microscopy.

In FIG. 1, first of all the basic setup of an arrangement for lightsheet microscopy is shown. This arrangement comprises a sample vessel 1 for receiving a sample 3 located in a medium 2, wherein the sample vessel 1 is aligned with respect to a flat reference surface 4. The arrangement also comprises an illumination optical system with an illumination objective 5 for illuminating the sample 3 via an illumination beam path with a lightsheet. The optical axis—when using aspherical or freely formed optical elements, the primary optical axis—6 of the illumination objective 5 and the lightsheet lie in one plane which, with the normal of the reference surface 4 encloses an illumination angle β different from zero. The arrangement also comprises a detection optical system with a detection objective 7 in a detection beam path, the optical axis 8 of which also encloses, with the normal of the reference surface, a detection angle δ different from zero. The arrangement also comprises a separating layer system with at least one layer made from a predetermined material with a predetermined thickness, which separates the medium 2 from the illumination objective 5 and the detection objective 7. The separating layer system is formed in contact with the medium 2 with a surface aligned parallel to the reference surface 4 at least in the area accessible to the illumination objective 5 and the detection objective 7 for illumination and detection.

In the present case, the sample vessel is formed as a Petri dish which is open towards the top and is filled with the medium 2. In order to prevent contamination, the illumination objective 5 and the detection objective 7 can either be arranged above the sample vessel 1—in this case only the air layer between the surface of the medium 2 and the objectives forms the separating layer system, insofar as no cover glass is used—or, as shown in FIG. 1, below the sample vessel 1. In this case, the separating layer system is formed on the one hand by the layer between sample vessel and objective, but on the other hand also by the transparent base of the sample vessel 1, which is manufactured from a material with a refractive index different from 1.0. The layer between sample vessel 1 and objective can be formed, for example, by an immersion medium.

Since detection objective 7 and illumination objective 5 are inclined with respect to the reference surface 4 and in particular to the base of the sample vessel 1, strong aberrations arise when light from the illumination objective 5, behind which a light source, not shown, is located, is directed through the separating layer system onto the sample 3, and light emitted by the sample 3—for example scattered, reflected, induced by fluorescence or generally emitted—likewise passes through the separating layer system obliquely in the direction of the detection objective 7.

In order to correct or overcome these aberrations and those which occur through varying angles of incidence of the detection objective, i.e. varying detection angle and/or those aberrations which occur through a varying thickness of the at least one layer of the separating layer system—here the sample vessel base—the detection objective 7 comprises a first adaptive optical detection correction element which is arranged in the beam path or can be introduced into the latter. Analogously, the illumination objective 5 can also comprise such a first adaptive optical illumination correction element; here, however, the illumination objective 5 was only basically sketched since all embodiments which relate to the detection objective 7 can also be transferred to the illumination objective in an analogous manner.

The first adaptive optical detection correction element is formed here as first wavefront manipulator 9. With the wavefront manipulator 9, aberrations which occur because of the inclined passage through boundary surfaces of the separating layer system of light to be detected can be reduced in dependence on the detection angle and/or in dependence on the thickness of the at least one layer of the separating layer system. In other words, aberrations which occur when the thickness of the at least one layer of the separating layer system and/or the detection angle, i.e. the angle of incidence of the detection objective 7, changes can therefore be corrected or reduced, in each case within predetermined ranges for the angle of incidence and the thickness. The wavefront manipulator 9 therefore corrects aberrations occurring through varying layer thicknesses and/or through varying angles of incidence within certain ranges, the boundaries of which depend on the actual design of the respective manipulator.

The layer between base and detection objective 7 can, for example, be air. Because of the large jumps in refractive index between the media, the rotationally asymmetrical errors which are to be corrected are relatively large, compared with the use of media with refractive indices which are similar to each other; realizing numerical apertures between 0.8 and 1.0 is technically very complex in this case. Between the base of the Petri dish and the objective there is therefore preferably an immersion medium, for example water. If the medium 2 is separated from the immersion medium by the base or a corresponding cover glass when observed from above, other immersion media can also be used for example those which represent a hostile environment to biological samples. If materials with similar refractive indices are chosen for the medium 2, the cover glass or the vessel base and the immersion medium between cover glass and objective, the corrections even for large numerical apertures can be realized more simply with freeform surfaces.

Here the illumination objective 5 is only indicated schematically, but as a rule it also comprises a plurality of lenses, in particular it can also comprise a first adaptive optical illumination correction element. In the example shown, the angle of the primary optical axis 8 of the detection beam path to the normal of the reference surface 4 is δ=32°; the opening angle in the case of a numerical aperture of 1.0 is ±48.55° in water. The angle of the illumination beam path with respect to the normal of the boundary surface is β=63° in the case of an opening angle of typically 22° in the case of a numerical aperture of NA=0.5. The thickness of the vessel base of the sample vessel 1 is typically in a range of 0.17 mm to 0.5 mm, usually up to 0.19 mm, but it can deviate from this.

In the example shown in FIG. 1, the detection objective 7 comprises precisely one adaptive optical detection correction element, which is designed as a wavefront manipulator 9. In addition, a detection correction lens, not shown here, can also be used, which corrects the main errors for a particular thickness of the at least one layer of the separating layer system, e.g. the vessel base, and a particular detection angle, with the result that the wavefront modulator 9 only corrects deviations therefrom. The principle of such a wavefront manipulator 9 is described for example in DE 10 2012 101 262 B3, the disclosure of which is explicitly referred to here again, and which is completely included here.

Figure 2:
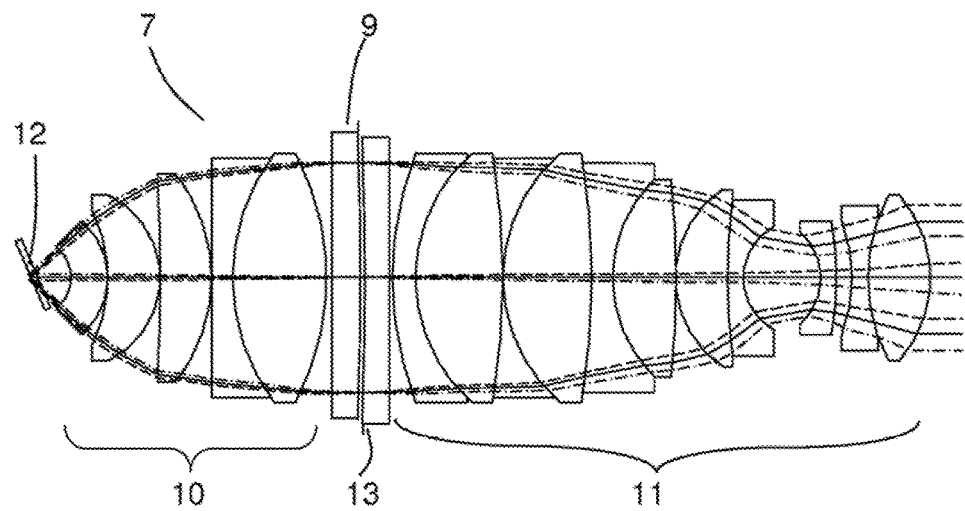
FIG. 2 a first embodiment of a detection objective in total view.
Figure 3:
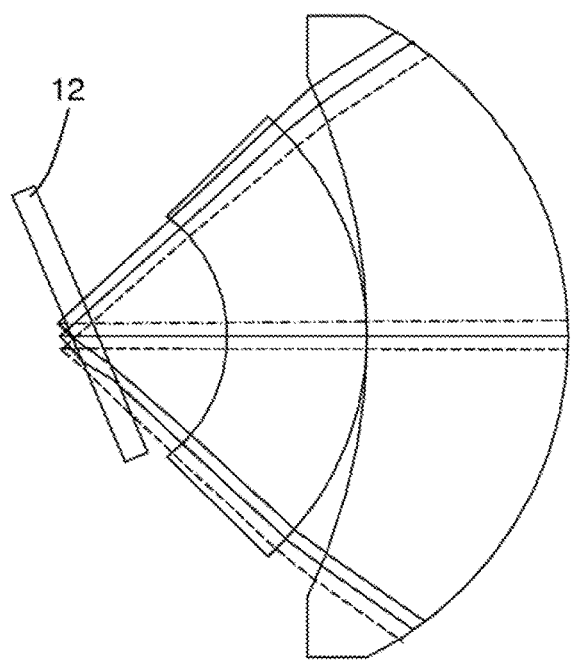
FIG. 3 the beam profile in the area of the front lens of the detection objective, FIGS. 4a)-c) representations of the wavefront error for the first embodiment, FIG. 5 a further embodiment of a detection objective in total view, and FIG. 6 the representation of the wavefront error for the further embodiment.

With reference to FIGS. 2 and 3, a first embodiment of a detection objective 7, which is part of the arrangement for lightsheet microscopy, is described in more detail. Analogous considerations and approaches can also be taken for the illumination objective 5. The detection objective 7 shown in FIG. 2 comprises a first adaptive optical detection correction element in the beam path, which is designed as a wavefront manipulator 9. FIG. 3 shows a corresponding section in the area of the front lens. The different line forms correspond to bundles of rays which emerge from different object points. The detection objective 7 has a numerical aperture of 1.0, all of the correction for the disturbing influences of a cover glass passed through at 32° for cover glass thicknesses between 0.15 mm and 0.19 mm is corrected by a single wavefront manipulator 9, which is arranged in the vicinity of the pupil of the detection objective 7, i.e. in a plane in which the beam path is collimated. Together with a corresponding tube lens system, an approximately 39 times magnification can be achieved. The detection objective 7 is designed for immersion in water, i.e. instead of a separating layer system made of cover glass/vessel base and air, here a separating layer system made of cover glass/vessel base and water is used. The detection objective 7 shown in meridional section in FIG. 2 comprises precisely one wavefront manipulator 9. This, in turn, comprises two freeform elements which can move transversally with respect to each other, wherein the first realizes a lateral adjustment path in the range from 139 μm to 177 μm, corresponding to cover glass thicknesses of 0.15 mm to 0.19 mm. The second freeform element correspondingly realizes an opposite adjustment path of the same size in the range from −139 μm in the case of a cover glass thickness of 0.15 mm to −177 μm in the case of a cover glass thickness of 0.19 mm. In the case of the average cover glass thickness of 0.17 mm, in this embodiment example, the freeform surfaces are thus not in the neutral position relative to each other but are already shifted by an adjustment path of 158 μm and −158 μm, respectively, from the zero position to compensate for the average cover glass thickness.

With this example system it is possible to practically completely compensate for the disturbing influences arising in the case of cover glass thicknesses between approx. 0.15 mm and 0.19 mm at a fixed angle δ between the primary objective axis 8 and the normal of the reference surface 4 of 32°, with the result that an essentially diffraction-limited imaging occurs. Of course, the wavefront manipulator 9 could also be utilized with a larger range of adjustment, but then the adjustment path no longer behaves in good linear approximation to the cover glass thickness and the residual wavefront errors remain significantly larger.

The objective comprises an object-side image field of 400 μm diameter and has, for example, a conventional internal focusing which can shift the object-side focal point by ±50 μm relative to the average focal position and can compensate for the spherical aberrations occurring. The internal focusing consists in the change of the airspace behind the front lens of the objective, therefore through shifting of the rest of the objective relative to the front lens, in a range from 114.5 μm with an object focal length of 0.15 mm in front of the cover glass, to 20 μm with an object focal length of 0.25 mm in front of the cover glass. The wavefront manipulator 9 is located between a first lens group 10 and a second detection lens group 11. Also shown is the position relative to the base of the sample vessel, the vessel base 12. Between the two freeform elements of the wavefront manipulator 9, in addition an aperture diaphragm 13 is arranged which is imaged to infinity in the object space by the first detection lens group 10, with the result that on the object side an approximately telecentric beam path exists.

In FIG. 3, the front part of the detection objective 7 is represented enlarged for an average object focal length of 0.2 mm of the average field point from the front lens of the objective. The associated airgap between the first and second lens is 55.2 μm here.

The imaging quality in the detection objective 7 is diffraction-limited over the entire defocusing range. It comprises, except for the wavefront manipulator 9, exclusively spherical lenses, the surfaces of which can be described by the customary apex form of the spherical equation $$z = \frac{(x^2 + y^2)/R}{1 + \sqrt{1 - (1+k) \cdot \frac{(x^2 + y^2)}{R^2}}}. \tag{6}$$

The z-axis corresponds to the primary optical axis of the detection objective 7, the x-axis is perpendicular to the plane of the page in FIG. 2 and in the other figures. In Table 1 below the optical construction data for the detection objective 7 shown in FIG. 2 and FIG. 3 are represented. All optical elements are designed as refractive glass elements.

TABLE 1

Objective data for the first embodiment example (FIG. 2, FIG. 3)

| No. | Radius (y) | Thickness/ distance | Glass type/ medium | Half diameter | Non-Centred Data |
|---|---|---|---|---|---|
| Object | ∞ | 0.2000 | Water | | |
| 1 | ∞ | 0.0000 | Water | 2.02 | Basic decentre |
| 2 | ∞ | 0.1500 | K5 | 2.02 | |
| 3 | ∞ | 0.0000 | Water | 2.35 | |
| 4 | ∞ | 1.8695 | Water | 0.61 | Basic decentre |
| 5 | −2.6003 | 2.1353 | NLASF31 | 1.86 | |
| 6 | −4.6951 | 0.0552 | | 3.43 | |
| 7 | −10.1283 | 2.9429 | SFPL51 | 4.16 | |
| 8 | −5.8423 | 0.0200 | | 5.01 | |
| 9 | −168.9298 | 3.3850 | SFPL53 | 6.60 | |
| 10 | −10.9746 | 0.0200 | | 6.99 | |
| 11 | −991.4694 | 1.0000 | SIO2 | 7.56 | |
| 12 | 13.9348 | 5.8585 | SFPL53 | 8.12 | |
| 13 | −16.4609 | 0.1000 | | 8.30 | |
| 14 | ∞ | 0.1000 | | 8.30 | |
| 15 | ∞ | 0.0000 | | 8.47 | Basic decentre |
| 16 | ∞ | 1.5000 | SLAH79 | 8.47 | |
| 17 | ∞ | 0.0000 | | 8.47 | |
| 18 | ∞ | 0.0000 | | 8.27 | Basic decentre |
| Stop | ∞ | 0.2000 | | 8.27 | |
| 20 | ∞ | 0.0000 | | 8.45 | Basic decentre |
| 21 | ∞ | 1.5000 | SLAH79 | 8.45 | |
| 22 | ∞ | 0.0000 | | 8.48 | |
| 23 | ∞ | 0.0000 | | 8.31 | Basic decentre |
| 24 | ∞ | 0.1000 | | 8.31 | |
| 25 | 45.4816 | 1.5000 | NKZFS11 | 8.35 | |
| 26 | 11.4710 | 5.7460 | SFPL53 | 8.16 | |

TABLE 1-continued

Objective data for the first embodiment example (FIG. 2, FIG. 3)

| No. | Radius (y) | Thickness/ distance | Glass type/ medium | Half diameter | Non-Centred Data |
|---|---|---|---|---|---|
| 27 | −35.4596 | 0.0200 | | 8.29 | |
| 28 | 11.3109 | 5.7621 | SFPL53 | 8.43 | |
| 29 | −45.2192 | 1.4000 | NKZFS11 | 8.07 | |
| 30 | 8.6183 | 4.6293 | SFPL53 | 6.84 | |
| 31 | −148.3167 | 0.0200 | | 6.73 | |
| 32 | 7.4611 | 3.6257 | SNBK53 | 6.17 | |
| 33 | 43.8435 | 1.1000 | STIL1 | 5.73 | |
| 34 | 3.8005 | 5.9878 | | 3.55 | |
| 35 | −4.7035 | 0.8000 | NKZFS4 | 3.29 | |
| 36 | −15.8946 | 1.2733 | | 3.77 | |
| 37 | −7.4287 | 1.0000 | NKZFS4 | 3.95 | |
| 38 | 10.6637 | 4.8693 | NSK2 | 5.48 | |
| 39 | −7.6635 | 0.0200 | | 5.78 | |
| 40 | ∞ | 126.5000 | | 5.98 | |
| 41 | 189.4170 | 10.9000 | NBALF4 | 15.36 | |
| 42 | −189.4170 | 60.0000 | | 15.52 | |
| 43 | ∞ | 80.0000 | NBK7 | 14.19 | |
| 44 | ∞ | 48.2000 | | 13.04 | |
| Image | ∞ | 0.0000 | | 11.99 | |

The y-radius in Table 1 is the apex radius in the y-z plane. The half diameter refers to the free half diameter, i.e. the required half diameter of the area through which all bundles of rays can pass through the optical system unvignetted, and is given in mm.

The areas are numbered from the object side, the numbers are given in the left-hand column. The sample is located in water at a temperature of approx. 23° C. or in a physiological salt solution. Likewise, the salt solution or the water is located between the vessel base 12 and the detection objective 7. The object-side surface of the vessel base 12 has the area number 2. Between the surface 18 and the surface 20, the aperture diaphragm 13, which is arranged between the two parts of the wavefront manipulator 9, is located, as can be learned from FIG. 2. The freeform surfaces of the wavefront manipulator correspond exactly to these surfaces 17 and 21. If a value of "infinity" is indicated for the y-radius, the surfaces are in each case a flat surface, unless the relevant surfaces are freeform surfaces. The thickness is given in mm, as is the y-radius. Except for the freeform surfaces 17 and 21, all surfaces are spherical or flat. The details in the last column relate to the decentring type. "Basic decentre" means that the coordinate system used to determine the coefficients etc. is tilted about the decentring data for the current and all subsequent surfaces. As decentring for surfaces 1 and 4 there is only a tilting of the cover glass here. For surface 1, the value ADE is therefore 32°, for surface 4 it is =32°, for this surface the value for the basic position given in Table 1 is YDE=−0.07463, as compensation for the parallel offset caused by the inclined cover glass. For the other positions, which are given in the following Table 2 from line 2, the value in each case is −0.04861, −0.02261, −0.03014, −0.00416, 0.02180, −0.08492, −0.05890 and −0.03288. All other values BDE, CDE, XDE, ZDE are equal to zero, for surface 1 also the value YDE=0. The details "XDE . . . CDE" relate to the decentring of the coordinate system and are to be understood to mean that the local coordinate system in which the corresponding surface is described by its sagitta formula, equation (1) or (4), is rotated by an angle ADE about the local x-axis, by an angle BDE about the local y-axis and about an angle CDE about the local z-axis with respect to the coordinate system of the previous surface shifted by the value in the column "thickness/distance" in the Z-direction. A positive sign means a counterclockwise rotation, a negative sign means a clockwise rotation about the respective local axis.

The values given in Table 1 in the lines "object", 2 and 6 only apply to the basic configuration in the case of a cover glass thickness of 0.15 mm and an object distance of 0.20 mm. Corresponding to Table 2 below, the cover glass thickness or the vessel base thickness can have values between 0.15 mm and 0.19 mm and the object distance values between 0.15 mm and 0.25 mm; the focusing airspace given in line 6 of Table 1 is then in a range between 0.02 mm and 0.115 mm.

The actor adjustment paths of the two freeform elements indicated in Table 2 correspond to the decentring data of surfaces 15 and 18 (actor adjustment path 1), and 20 and 23 (actor adjustment path 2) and describe the lateral displacements of the two freeform elements of the wavefront manipulator in the respective configuration positions for different object distances and cover glass thicknesses, as was already described above.

TABLE 2

Actor adjustment paths of the freeform elements, first embodiment example

| Object distance | Cover glass thickness | Focusing airspace | Actor adjustment path 1 | Actor adjustment path 2 |
|---|---|---|---|---|
| 0.20 | 0.15 | 0.0552 | 0.1394 | −0.1394 |
| 0.20 | 0.17 | 0.0552 | 0.1582 | −0.1582 |
| 0.20 | 0.19 | 0.0552 | 0.1770 | −0.1770 |
| 0.25 | 0.15 | 0.0200 | −0.1394 | −0.1394 |
| 0.25 | 0.17 | 0.0200 | 0.1582 | −0.1582 |
| 0.25 | 0.19 | 0.0200 | 0.1770 | −0.1770 |
| 0.15 | 0.15 | 0.1145 | 0.1394 | −0.1394 |
| 0.15 | 0.17 | 0.1145 | 0.1582 | −0.1582 |
| 0.15 | 0.19 | 0.1145 | 0.1770 | −0.1770 |

The wavefront manipulator 9 comprises precisely two freeform surfaces, the shape of which is described by a purely polynomial development according to formula (1), i.e. by $$z = \sum_{m,n=1}^{\infty} C_{m,n} x^m y^n.$$

Here, x, y and z refer to the three Cartesian coordinates of a point lying on the surface in the local, area-related coordinate system. The coefficients of the polynomial development are in each case given in the corresponding lines of the associated area number, wherein the polynomial coefficients are characterized with the powers of the associated development terms. The polynomial coefficients of the freeform surfaces of the wavefront manipulator 9 are determined by an optimization calculation and reproduced in Table 3.

TABLE 3

Polynomial coefficients of the freeform surface of the wavefront manipulator (FIG. 2)

| | | | | | |
|---|---|---|---|---|---|
| X2: | −3.2154E−03 | Y2: | −73916E−04 | X2Y: | −1.0149E−04 |
| Y3: | 5.6987E−05 | X3: | −1.9215E−05 | X2Y2: | −2.2498E−05 |
| Y4: | −1.4522E−05 | X4Y: | 2.1058E−06 | X2Y3: | 2.4235E−06 |
| Y5: | 1.1379E−06 | X6: | 1.8211E−07 | X4Y2: | −7.2456E−08 |
| X2Y4: | −9.9696E−08 | Y6: | −4.7971E−08 | X6Y: | 9.8290E−09 |
| X4Y3: | 9.9328E−09 | X2Y5: | 8.1740E−09 | Y7: | 2.3963E−09 |
| X8: | −5.2562E−10 | X6Y2: | −2.6458E−10 | X4Y4: | −5.7468E−10 |
| X2Y6: | −4.3483E−10 | Y8: | −7.1325E−11 | | |

The text "X2Y3" refers to the coefficients $C_{2,3}$, i.e. m=2, n=3, etc. "Y" would mean m=0 and n=1.

The refractive indices of the optical media used are given in Table 4 for some selected wavelengths.

TABLE 4

Glass grades used in the example according to FIG. 2

| Glass grade/Medium | λ [nm] | | | | |
|---|---|---|---|---|---|
| | 656.00 | 587.00 | 546.00 | 486.00 | 435.00 |
| Water | 1.3309 | 1.3328 | 1.3342 | 1.3369 | 1.3400 |
| K5 | 1.5198 | 1.5225 | 1.5246 | 1.5286 | 1.5335 |
| SFPL53 | 1.4373 | 1.4388 | 1.4399 | 1.4420 | 1.4445 |
| NKZFS11 | 1.6332 | 1.6378 | 1.6413 | 1.6483 | 1.6569 |
| SNBH53 | 1.7313 | 1.7381 | 1.7434 | 1.7542 | 1.7680 |
| NKZFS4 | 1.6092 | 1.6134 | 1.6166 | 1.6230 | 1.6309 |
| NBALF4 | 1.5763 | 1.5796 | 1.5821 | 1.5871 | 1.5931 |
| NBK7 | 1.5143 | 1.5168 | 1.5187 | 1.5224 | 1.5268 |
| NLASF31 | 1.8743 | 1.8807 | 1.8858 | 1.8957 | 1.9082 |
| SFPL51 | 1.4951 | 1.4970 | 1.4985 | 1.5012 | 1.5046 |
| SIO2 | 1.4564 | 1.4585 | 1.4601 | 1.4631 | 1.4667 |
| STIL1 | 1.5446 | 1.5481 | 1.5510 | 1.5566 | 1.5635 |
| NSK2 | 1.6041 | 1.6074 | 1.6099 | 1.6149 | 1.6208 |
| SLAH79 | 1.9930 | 2.0034 | 2.0117 | 2.0285 | 2.0501 |

Figure 4A:
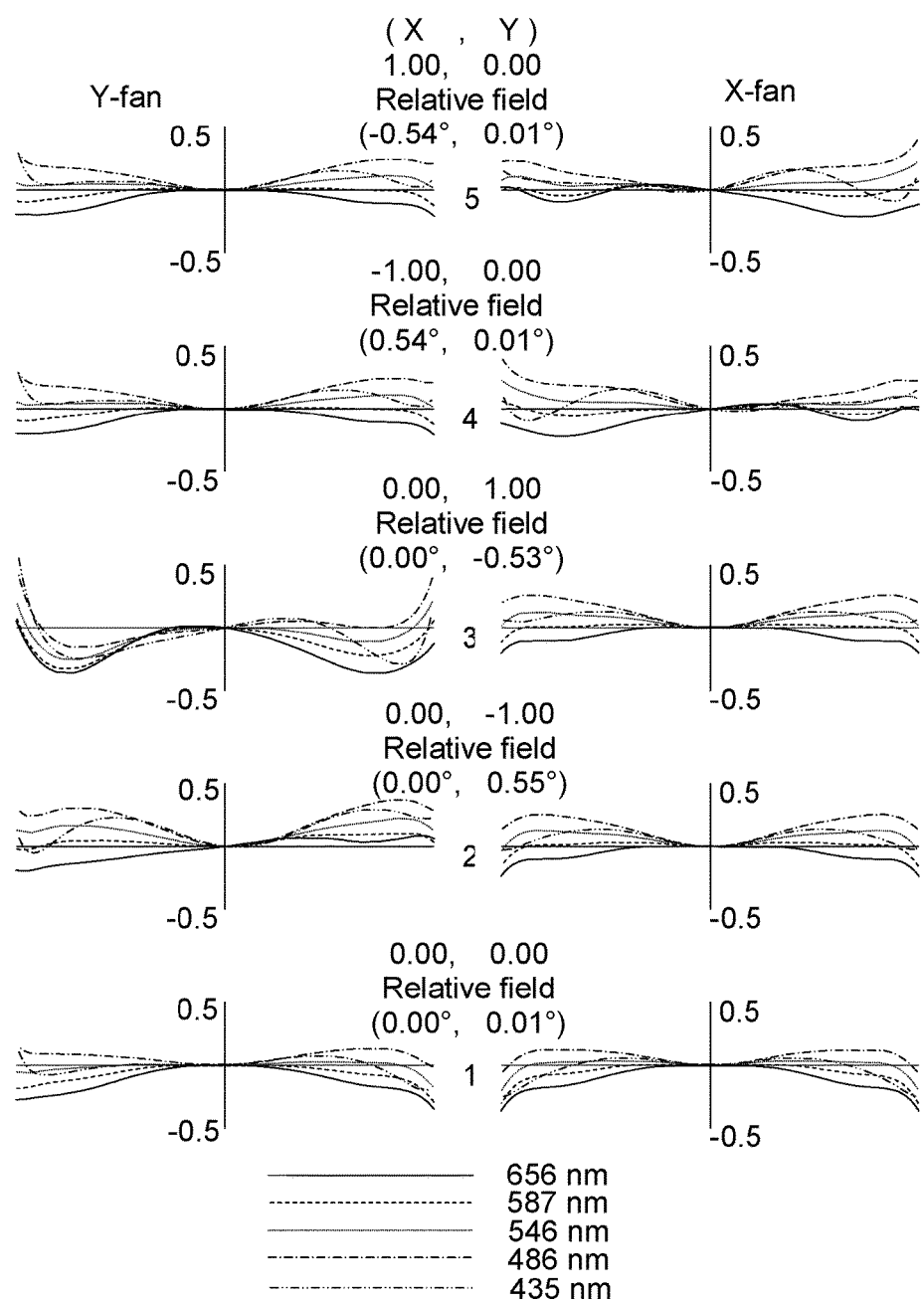

Finally, in FIGS. 4a) to 4c), the residual wavefront error, therefore the correction state of the objective for some selected combinations of object position and thickness of the vessel base or of the cover glass, is represented for this first embodiment example, for wavelengths in a range between 435 nm and 656 nm. From the representations it can be learned that the objective almost completely compensates for the disturbing influences and supplies a practically diffraction-limited imaging in all positions. The imaging quality is diffraction-limited over the entire range of thicknesses of the vessel base and over the entire defocusing range.

Figure 4B:
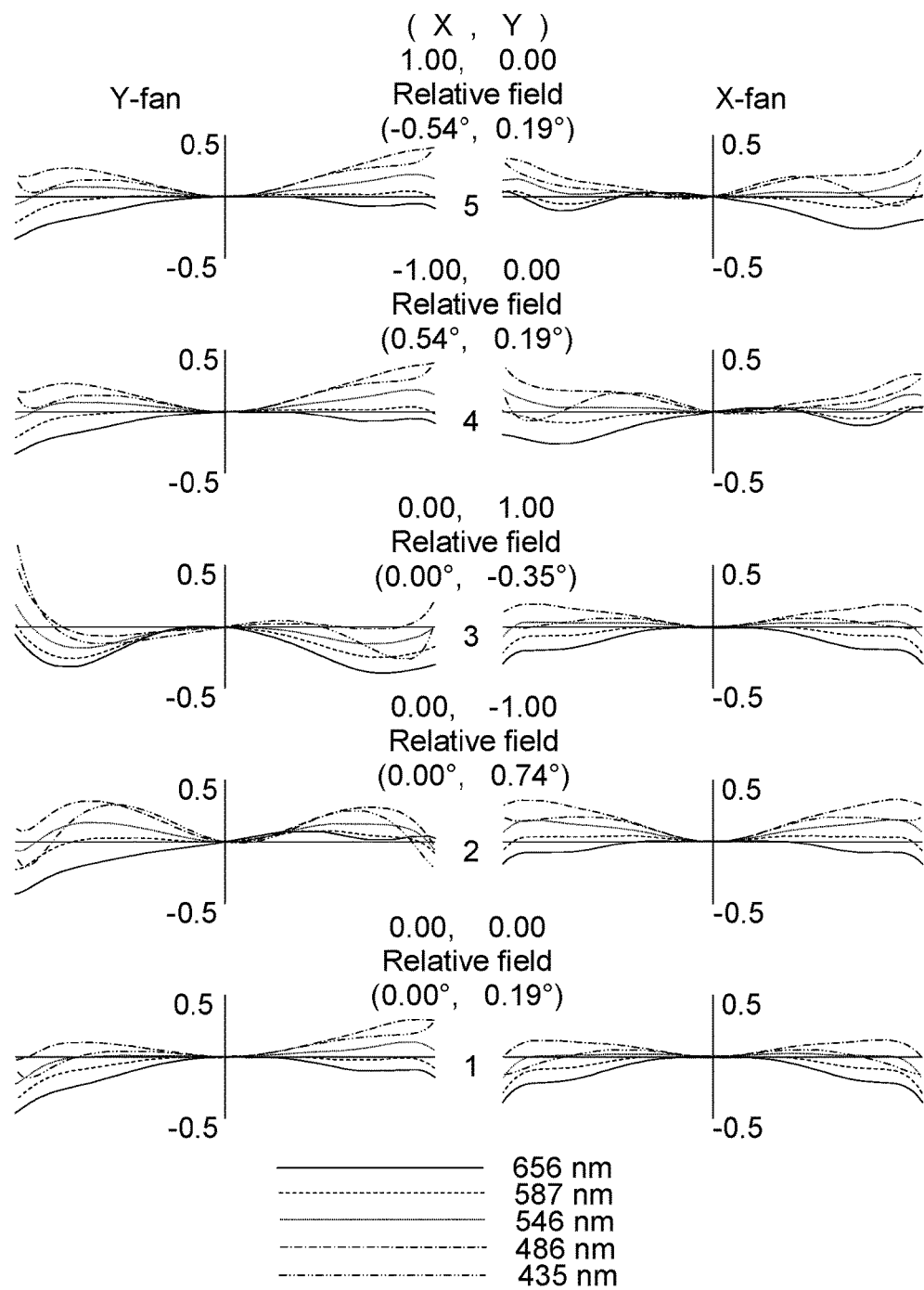
Figure 4C:
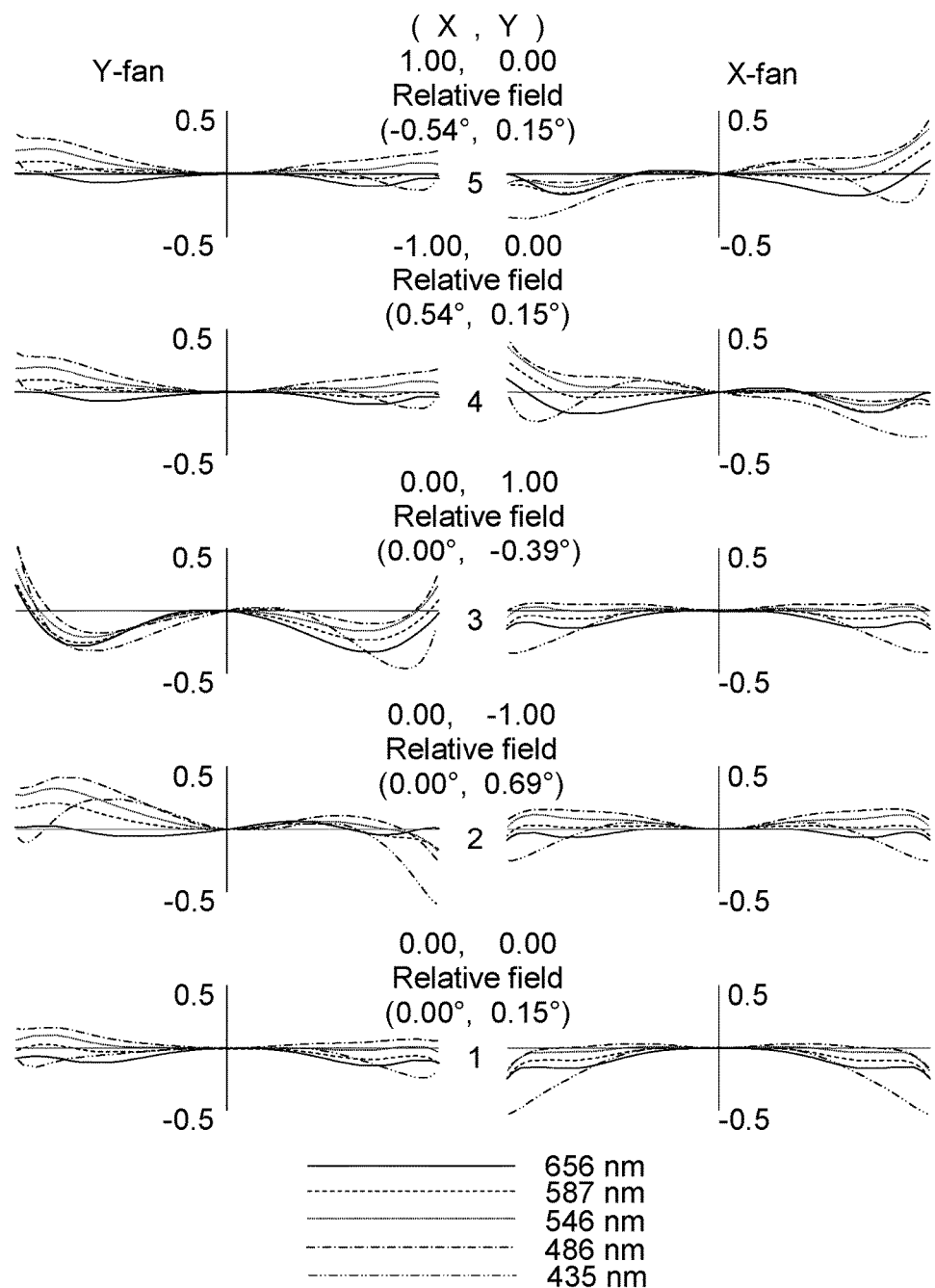

In FIG. 4a), the wavefront error is represented for an object distance of 0.20 mm, a vessel base thickness or cover glass thickness of 0.15 mm and a focusing airspace of 0.0552 mm, corresponding to the first line of Table 2. In FIG. 4b), the wavefront error is represented for an object distance of 0.25 mm, a vessel base thickness or cover glass thickness of 0.17 mm and a focusing airspace of 0.02 mm, corresponding to the fifth line of Table 2. In FIG. 4c), the wavefront error is represented for an object distance of 0.15 mm, a vessel base thickness or cover glass thickness of 0.19 mm and a focusing airspace of 0.1145 mm, corresponding to the last line of Table 2. The image error curves are in each case represented for the axial field point, i.e. the image centre, and for the four field points at the edge of the image field circle in the intersections with the coordinate axes. The vertical axis refers to the wavefront error, wherein the scale goes from −0.5 mm to 0.5 mm. The figures show on the left-hand side in each case the residual wavefront error as a function of the y-coordinate (y-fan) and on the right-hand side the residual wavefront error as a function of the x-coordinate (x-fan).

Figure 5:
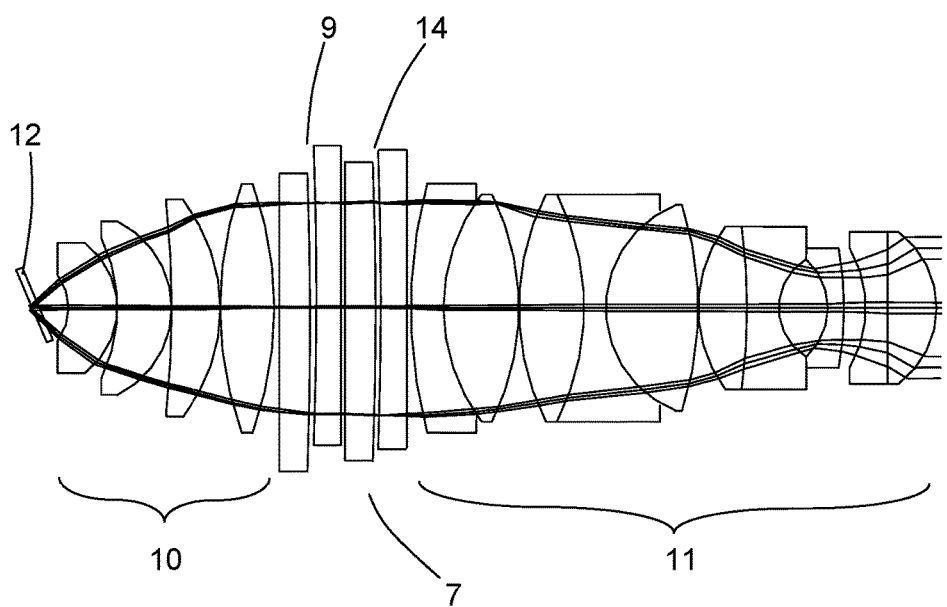

A second embodiment example is represented in FIG. 5. This is a detection objective 7 with two integrated wavefront manipulators 9, 14. The two wavefront manipulators 9, 14 are designed to simultaneously compensate on the one hand for imaging errors which are caused by varying thicknesses of the vessel base 12 and of the detection angle δ, i.e. the angle of incidence with respect to the vessel base 12 and on the other hand for aberrations which are caused by a varying object position in the immersion medium and require refocusing. The object distance can vary by 5 mm around an average object distance of 0.40 mm, i.e. between 0.35 mm and 0.45 mm. At the same time, the thickness of the vessel base 12 can vary by 0.1 mm around an average thickness of 0.17 mm, i.e. between 0.16 mm and 0.18 mm. The detection angle δ between the detection axis, i.e. the primary objective axis and the normal of the reference surface 4, which corresponds to the plane of the vessel base 12, can also vary by 1° about an average angle of 26°, i.e. between 25° and 27°. All variations can arise in combination with each other.

As in the example shown in FIG. 2, the detection objective 7 represented in FIG. 5 comprises a numerical aperture of 1.0 and is designed for immersion in water. The imaging scale in the case of the nominal or set point values, i.e. the average values of the above-named variable parameters, includes a tube lens optical system 40:1, not shown here. The detection objective 7 has an object-side image field of 200 μm diameter. The two wavefront manipulators 9 and 14 each comprise two freeform elements which can move transversally with respect to each other. With this example system it is possible to practically completely compensate for the disturbing influences arising from the different combinations of object position, cover glass or vessel base thickness and angle of incidence, with the result that an essentially diffraction-limited imaging occurs.

FIG. 5 shows the detection objective 7 for an object distance of 0.35 mm with a vessel base thickness of 0.16 mm and an angle of incidence of 25°. The freeform elements in the first wavefront manipulator 9 are displaced by ±1.608 mm and the freeform elements in the further wavefront manipulator 14 are displaced by ±0.982 mm. The three different beam profiles correspond to bundles of rays which emerge from different object points.

Figure 6:
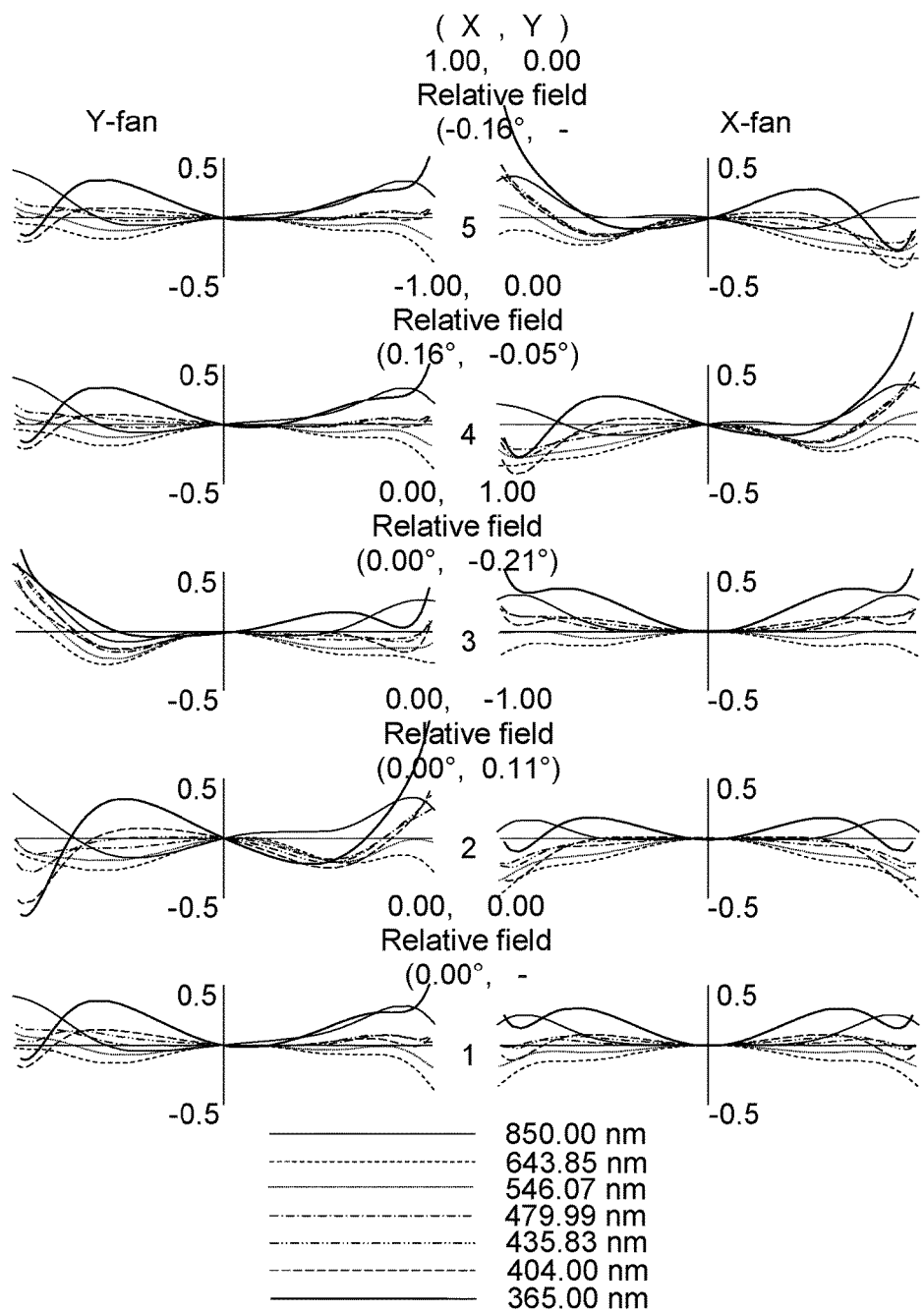

Finally, FIG. 6 shows in analogy to FIGS. 4a)-4c) by way of example the associated correction representation for the objective configuration shown in FIG. 5, i.e. the residual wavefront error. An essentially diffraction-limited correction can be seen in a very large wavelength range between 365 nm and 850 nm. For other combinations of parameters, such as for example given in Tables 6a to 6c, similarly good correction states result.

The optical construction data for the detection objective 7 shown in FIG. 5 are given in Table 5. With varying cover glass thickness, the corresponding value in line 2 of the table and the focusing airspace given in line 6 in Table 5 change, and likewise the object distance is not a constant size. In the following tables 6a-6c different object distances are taken into account.

TABLE 5

Objective data for the second embodiment example (FIG. 5)

| No. | Radius (y) | Thickness/ distance | Glass type/ medium | Half diameter | Non-Centred Data |
|---|---|---|---|---|---|
| Object | ∞ | 0.3500 | Water | | |
| 1 | ∞ | 0.0000 | Water | 1.58 | Basic decentre |
| 2 | ∞ | 0.1600 | K5 | 1.58 | |
| 3 | ∞ | 0.0000 | Water | 1.86 | |
| 4 | ∞ | 1.2000 | Water | 0.80 | Basic decentre |
| 5 | −4.5119 | 2.9701 | NLASF44 | 1.75 | |
| 6 | −5.1833 | 0.0500 | | 3.48 | |
| 7 | −9.3871 | 3.1929 | SFPL53 | 3.93 | |
| 8 | −6.3663 | 0.0200 | | 5.05 | |
| 9 | −34.0326 | 2.6626 | SFPL53 | 6.08 | |
| 10 | −10.6222 | 0.0200 | | 6.49 | |
| 11 | 28.0140 | 3.0266 | SFPL53 | 7.35 | |
| 12 | −24.0690 | 0.2000 | | 7.43 | |
| 13 | ∞ | 0.0000 | | 9.41 | Basic decentre |
| 14 | ∞ | 1.4000 | NLASF44 | 9.41 | |
| 15 | ∞ | 0.0000 | | 9.40 | |
| 16 | ∞ | 0.0000 | | 7.41 | Basic decentre |
| 17 | ∞ | 0.1000 | | 7.41 | |
| 18 | ∞ | 0.0000 | | 9.41 | Basic decentre |
| 19 | ∞ | 1.4000 | NLASF44 | 9.41 | |
| 20 | ∞ | 0.0000 | | 9.41 | |
| 21 | ∞ | 0.0000 | | 7.41 | Basic decentre |
| 22 | ∞ | 0.1000 | | 7.41 | |
| 23 | ∞ | 0.0000 | | 8.94 | Basic decentre |
| 24 | ∞ | 1.4000 | NLASF44 | 8.94 | |
| 25 | ∞ | 0.0000 | | 8.94 | |
| 26 | ∞ | 0.0000 | | 7.41 | Basic decentre |
| Stop | ∞ | 0.1000 | | 7.40 | |
| 28 | ∞ | 0.0000 | | 8.94 | Basic decentre |
| 29 | ∞ | 1.4000 | NLASF44 | 8.94 | |
| 30 | ∞ | 0.0000 | | 8.96 | |
| 31 | ∞ | 0.0000 | | 7.44 | Basic decentre |
| 32 | ∞ | 0.0200 | | 7.44 | |
| 33 | 47.8946 | 1.5000 | NKZFS11 | 7.45 | |
| 34 | 11.4953 | 5.3391 | SFPL53 | 7.30 | |
| 35 | −15.7077 | 0.0200 | | 7.36 | |
| 36 | 15.2591 | 4.3880 | SFPL53 | 6.87 | |
| 37 | −15.5375 | 1.4894 | NKZFS11 | 6.55 | |
| 38 | 7.7658 | 6.4441 | SFPL53 | 5.75 | |
| 39 | −32.7088 | 0.0200 | | 5.69 | |
| 40 | 9.2942 | 4.0670 | SNBH53 | 5.45 | |
| 41 | −22.7060 | 2.7663 | NKZFS2 | 4.81 | |
| 42 | 3.6115 | 3.1566 | | 2.78 | |
| 43 | −4.0162 | 0.8000 | NKZFS4 | 2.70 | |
| 44 | −14.3255 | 1.2490 | | 3.10 | |
| 45 | −6.8388 | 1.0000 | NKZFS8 | 3.32 | |
| 46 | 177.9012 | 2.9672 | NLAK8 | 4.08 | |
| 47 | −6.2616 | 0.1503 | | 4.49 | |
| 48 | ∞ | 126.5000 | | 4.56 | |
| 49 | 189.4170 | 10.9000 | NBALF4 | 8.37 | |
| 50 | −189.4170 | 60.0000 | | 8.39 | |
| 51 | ∞ | 80.0000 | NBK7 | 7.07 | |
| 52 | ∞ | 48.2000 | | 5.91 | |
| Image | ∞ | 0.0000 | | 4.97 | |

The angle of tilt of the vessel base 12, which varies here between 25° and 27°, is described by the decentring data of the surfaces 1 and 4. Here, for surface 1, the value ADE=25°, all other decentring values are zero. For surface 4, the value ADE=−25° and, as compensation for the parallel offset caused by the inclined cover glass, there is a decentring of YDE=−0.079265, in the case of the basic position given in Table 5.

The actor adjustment paths of the two wavefront manipulators given in Tables 6a-6c and thus four freeform elements or eight surfaces correspond to the decentring data of surfaces 13 and 16 (actor adjustment path 1), 18 and 21 (actor adjustment path 2), 23 and 26 (actor adjustment path 3), and 28 and 31 (actor adjustment path 4) and describe the lateral displacements of the freeform elements of the wavefront manipulators in the respective configuration positions for different object distances and cover glass thicknesses. The cover glass thickness or the thickness of the vessel base is in each case 0.16 mm in Table 6a, 0.17 mm in Table 6b and 0.18 mm in Table 6c. The angle refers in each case to the angle of incidence of the detection objective with respect to the vessel base, measured between the primary optical axis of the objective and the normal of the vessel base.

TABLE 6a

Actor adjustment paths of the second embodiment example, cover glass thickness 0.16 mm

| Object distance | Angle | Actor adjustment path | | | |
|---|---|---|---|---|---|
| | | 1 | 2 | 3 | 4 |
| 0.35 | 25° | −1.60811 | 1.60811 | −0.98223 | 0.98223 |
| 0.40 | 25° | −1.60811 | 1.60811 | 0.20103 | −0.20103 |
| 0.45 | 25° | −1.60811 | 1.60811 | 1.38924 | −1.38924 |
| 0.35 | 26° | −1.70905 | 1.70905 | −1.11069 | 1.11069 |
| 0.40 | 26° | −1.70905 | 1.70905 | 0.07332 | −0.07332 |
| 0.45 | 26° | −1.70905 | 1.70905 | 1.25987 | −1.25987 |
| 0.35 | 27° | −1.81311 | 1.81311 | −1.24433 | 1.24433 |
| 0.40 | 27° | −1.81311 | 1.81311 | −0.05925 | 0.05925 |
| 0.45 | 27° | −1.81311 | 1.81311 | 1.12584 | −1.12584 |

TABLE 6b

Actor adjustment paths of the second embodiment example, cover glass thickness 0.17 mm

| Object distance | Angle | Actor adjustment path | | | |
|---|---|---|---|---|---|
| | | 1 | 2 | 3 | 4 |
| 0.35 | 25° | −1.69493 | 1.69493 | −0.91535 | 0.91535 |
| 0.40 | 25° | −1.69493 | 1.69493 | 0.26749 | −0.26749 |
| 0.45 | 25° | −1.69493 | 1.69493 | 1.45657 | −1.45657 |
| 0.35 | 26° | −1.79992 | 1.79992 | −1.05037 | 1.05037 |
| 0.40 | 26° | −1.79992 | 1.79992 | 0.13313 | −0.13313 |
| 0.45 | 26° | −1.79992 | 1.79992 | 1.32033 | −1.32033 |
| 0.35 | 27° | −1.90799 | 1.90799 | −1.19053 | 1.19053 |
| 0.40 | 27° | −1.90799 | 1.90799 | −0.00603 | 0.00603 |
| 0.45 | 27° | −1.90799 | 1.90799 | 1.17952 | −1.17952 |

TABLE 6c

Actor adjustment paths of the second embodiment example, cover glass thickness 0.18 mm

| Object distance | Angle | Actor adjustment path | | | |
|---|---|---|---|---|---|
| | | 1 | 2 | 3 | 4 |
| 0.35 | 25° | −1.77977 | 1.77977 | −0.84579 | 0.84579 |
| 0.40 | 25° | −1.77977 | 1.77977 | 0.33669 | −0.33669 |
| 0.45 | 25° | −1.77977 | 1.77977 | 1.52676 | −1.52676 |
| 0.35 | 26° | −1.88849 | 1.88849 | −0.98694 | 0.98694 |
| 0.40 | 26° | −1.88849 | 1.88849 | 0.19609 | −0.19609 |
| 0.45 | 26° | −1.88849 | 1.88849 | 1.38405 | −1.38405 |
| 0.35 | 27° | −2.00000 | 2.00000 | −1.13291 | 1.13291 |
| 0.40 | 27° | −2.00000 | 2.00000 | 0.05103 | −0.05103 |
| 0.45 | 27° | −2.00000 | 2.00000 | 1.23713 | −1.23713 |

The decentring data of the surfaces 13, 16, 18 and 21—the actor adjustment paths 1 and 2—describe the lateral displacements of the two freeform elements of the first wavefront manipulator 9 in the respective configuration positions, and the decentring data of the surfaces 23, 26, 28 and 31—the actor adjustment paths 3 and 4—describe the lateral displacements of the two freeform elements of the further wavefront manipulator 14.

The polynomial coefficients of the freeform surfaces of the first wavefront manipulator 9 are given in the upper part in Table 7, and the polynomial coefficients of the freeform surfaces of the second, further wavefront manipulator 14 are given in the last three lines of Table 7.

TABLE 7

Polynomial coefficients of the wavefront manipulators 9, 14 (FIG. 5)

| | | | | | |
|---|---|---|---|---|---|
| X2: | 6.7323E−04 | Y2: | 4.1985E−04 | X2Y: | 3.1255E−04 |
| Y3: | 9.7271E−05 | X4: | 3.3902E−05 | X2Y2: | 1.8174E−06 |
| Y4: | 1.1640E−06 | X4Y: | −9.0013E−07 | X2Y3: | −7.1391E−07 |
| Y5: | −2.5311E−07 | X6: | 2.1008E−07 | X4Y2: | 1.0556E−08 |
| X2Y4: | 1.3341E−08 | Y6: | 5.3998E−09 | | |
| X2Y: | −2.3237E−04 | Y3: | −7.7885E−05 | X4Y: | 4.9977E−07 |
| X2Y3: | 3.2674E−07 | Y5: | 9.9591E−08 | X6Y: | −1.3006E−09 |
| X4Y3: | −1.1181E−09 | X2Y5: | −6.7032E−10 | Y7: | −1.6929E−10 |

Finally, in Table 8 the refractive indices of the optical media which were used for this embodiment example are given.

TABLE 8

Glass grades used in the example according to FIG. 5

| Glass grade/Medium | λ [nm] | | | | | | |
|---|---|---|---|---|---|---|---|
| | 850.00 | 643.85 | 546.07 | 479.99 | 435.83 | 404.00 | 365.00 |
| Water | 1.3269 | 1.3312 | 1.3342 | 1.3372 | 1.3399 | 1.3425 | 1.3466 |
| K5 | 1.5151 | 1.5202 | 1.5246 | 1.5291 | 1.5334 | 1.5374 | 1.5441 |
| SFPL53 | 1.4348 | 1.4376 | 1.4399 | 1.4422 | 1.4444 | 1.4465 | 1.4499 |
| NLASF44 | 1.7901 | 1.7998 | 1.8083 | 1.8173 | 1.8259 | 1.8342 | 1.8481 |
| NKZFS11 | 1.6255 | 1.6340 | 1.6413 | 1.6492 | 1.6567 | 1.6640 | 1.6764 |
| SNBH53 | 1.7203 | 1.7324 | 1.7434 | 1.7556 | 1.7677 | 1.7798 | 1.8013 |
| NKZFS2 | 1.5495 | 1.5557 | 1.5608 | 1.5661 | 1.5711 | 1.5759 | 1.5838 |
| NKZFS4 | 1.6021 | 1.6099 | 1.6166 | 1.6238 | 1.6307 | 1.6374 | 1.6487 |
| NKZFS8 | 1.7042 | 1.7153 | 1.7254 | 1.7364 | 1.7472 | 1.7580 | 1.7769 |
| NLAK8 | 1.7019 | 1.7096 | 1.7162 | 1.7230 | 1.7294 | 1.7354 | 1.7457 |
| NBALF4 | 1.5707 | 1.5768 | 1.5821 | 1.5877 | 1.5930 | 1.5981 | 1.6066 |
| NBK7 | 1.5098 | 1.5147 | 1.5187 | 1.5228 | 1.5267 | 1.5303 | 1.5363 |

LIST OF REFERENCE NUMBERS

1 Sample vessel
2 Medium
3 Sample
4 Reference surface
5 Illumination objective
6 Optical axis
7 Detection objective
8 Optical axis
9 First wavefront manipulator
10 First detection lens group
11 Second detection lens group
12 Vessel base
13 Aperture diaphragm
14 Further wavefront manipulator
β Illumination angle
δ Detection angle

The invention claimed is:

1. An arrangement for lightsheet microscopy, comprising:
an illumination optical system with an illumination objective for illuminating a sample located in a medium on a sample carrier via an illumination beam path with a lightsheet, wherein the optical axis of the illumination objective and the lightsheet lie in one plane which, with the normal of a flat reference surface with respect to which the sample carrier is aligned, encloses an illumination angle (β) different from zero;

a detection optical system with a detection objective in a detection beam path, the optical axis of which encloses, with the normal of the reference surface, a detection angle (δ) different from zero;

a separating layer system with at least one layer made from a predetermined material with a predetermined thickness, which separates the medium from the illumination objective and the detection objective, wherein the separating layer system is in contact with the medium with a surface aligned parallel to the reference surface at least in the area accessible to the illumination objective and the detection objective for illumination and detection, wherein:

the detection objective comprises means for reducing aberrations which occur because of the inclined passage of light through boundary surfaces of the separating layer system for a predetermined range of detection angles (δ) or of illumination angles (β) and/or for a predetermined range of the thickness of the at least one layer of the separating layer system, said means for reducing aberrations including a first transmissive adaptive optical detection correction element formed as a wavefront manipulator and arranged in the beam path or which can be selectively introduced into the beam path or the illumination objective comprises a first transmissive adaptive optical illumination correction element formed as a wavefront manipulator and arranged in the beam path or which can be selectively introduced into the beam path, wherein the detection objective comprises a first detection lens group, which images an object-side image field at least approximately into infinity, and a second detection lens group; and
wherein the first adaptive optical detection correction element is arranged between the first detection lens group and the second detection lens group; or
wherein the illumination objective comprises a first illumination lens group, which images an object-side image field at least approximately into infinity, and a second illumination lens group, wherein the first adaptive optical illumination correction element is arranged between the first and second illumination lens group.

2. The arrangement according to claim 1, wherein the detection objective comprises means for correcting aberrations at a predetermined detection angle (δ) and a predetermined thickness of the layer of the separating layer system, said means for correcting aberrations at a predetermined detection angle (δ) and a predetermined thickness of the layer of the separating layer system including a detection correction lens which is formed with at least one freeform surface or is formed such that it can be pivoted into the beam path of the detection objective, or in that the illumination objective comprises means for correcting aberrations at a predetermined illumination angle (β) and a predetermined thickness of the layer of the separating layer system, said means for correcting aberrations at a predetermined detection angle (δ) and a predetermined thickness of the layer of the separating layer system including an illumination correction lens which is formed with at least one freeform surface and/or is formed such that it can be pivoted into the beam path of the illumination objective, and the first adaptive optical detection correction element and the first adaptive optical illumination correction element correcting aberrations which arise because of deviations from the predetermined thickness and/or from the predetermined angle of incidence.

3. The arrangement according to claim 1, wherein the detection objective comprises at least one further adaptive optical detection correction element which can be introduced into the beam path or is arranged therein or the illumination objective comprises at least one further adaptive optical illumination correction element which can be introduced into the beam path or is arranged therein, wherein the further adaptive optical detection and illumination correction elements correct aberrations which arise through changes in the optical properties of an immersion medium or of the separating layer system, or during focusing on other object focal lengths, or for internal focusing accompanied by simultaneous correction of spherical aberrations arising during changes in focus, or to increase the depth of field.

4. The arrangement according to claim 3, wherein the at least one further adaptive optical detection correction element or the at least one further adaptive optical illumination correction element are formed as wavefront manipulators, and wherein each of the wavefront manipulators comprises two freeform surfaces which can move relative to each other laterally with respect to the optical axis or two freeform surfaces which can rotate in opposite directions about an axis of rotation which is perpendicular to the optical axis.

5. The arrangement according to claim 4, wherein, between the freeform surfaces which can move relative to each other, in each case an immersion medium is introduced, wherein, at an average wavelength of an observed spectral range for the optically active materials of the wavefront manipulators with a refractive index $n_1$ and an Abbe number of $v_1$ and of the immersion medium with a refractive index $n_2$ and an Abbe number $v_2$, the condition $$\left| \frac{n_1 - 1}{v_1} - \frac{n_2 - 1}{v_2} \right| \leq 0.05$$

is fulfilled or the conditions $|n_1-n_2| \leq 0.05$ and $|v_1-v_2| \geq 5$ are fulfilled simultaneously.

6. The arrangement according to claim 4, wherein the optical elements on which the freeform surfaces are formed are manufactured from a material with an abnormal partial dispersion and/or an immersion medium comprises a dispersion profile which deviates from the normal line.

7. The arrangement according to claim 1, wherein the first detection lens group and the at least one layer of the separating layer system or the first illumination lens group and the at least one layer of the separating layer system in each case form an optical system which fulfills the condition $$h_1 = f_{FG} \cdot \sin \sigma_0 = n_0 \cdot f_{FG}' \cdot \sin \sigma_0'$$

wherein $h_1$ is the height of incidence of the opening beam on the wavefront manipulator, $\sigma_0$ is the angle of beam inclination of the marginal beam against the optical axis, $f_{FG} = -n_0 * f_{FG}'$ is the front, object-side focal length of the front lens group and $n_0$ is the refractive index of the immersion medium between object and front lens.

8. A microscope objective for lightsheet microscopy, comprising:
a first lens group, which images an object-side image field at least approximately into infinity;
an aperture diaphragm arranged after the first lens group;
a second lens group arranged after the aperture diaphragm; and
means for reducing aberrations which occur because of an inclined passage of light for detection or illumination of a sample through a sample carrier for a predetermined range of angles of incidence with respect to the normal of the sample carrier and/or for a predetermined range of thicknesses of the sample carrier, said means including a first transmissive adaptive optical imaging correction element formed as a wavefront manipulator and arranged or introducible between the first lens group and the second lens group.

9. The microscope objective according to claim 8, comprising at least one further adaptive optical imaging correction element arranged between the two lens groups or which can be introduced between the two lens groups, which is designed for the correction of aberrations which arise through changes in the optical properties of an immersion medium or of the separating layer system, or during focusing on other object focal lengths, or to increase the depth of field.

10. The microscope objective according to claim 9, wherein the first and the further adaptive optical imaging element are formed as wavefront manipulators, wherein each of the wavefront manipulators comprises two freeform surfaces which can move relative to each other laterally with respect to the optical axis or two freeform surfaces which can rotate in opposite directions about an axis of rotation which is perpendicular to the optical axis.

11. The microscope objective according to claim 10, wherein, between the freeform surfaces which can move relative to each other, in each case an immersion medium is introduced, wherein, at an average wavelength of an observed spectral range for optically active materials of the wavefront manipulators with a refractive index $n_1$ and an Abbe number of $v_1$ and of the immersion medium with a refractive index $n_2$ and an Abbe number $v_2$, the condition $$\left| \frac{n_1 - 1}{v_1} - \frac{n_2 - 1}{v_2} \right| \leq 0.05$$

is fulfilled, or the conditions $|n_1-n_2| \leq 0.05$ and $|v_1-v_2| \geq 5$ are fulfilled simultaneously.

12. The microscope objective according to claim 10, wherein the optical elements on which the freeform surfaces are formed are manufactured from a material with an abnormal partial dispersion and/or an immersion medium comprises a dispersion profile which deviates from the normal line.

\* \* \* \* \*